United States Patent Office 3,362,811
Patented Jan. 9, 1968

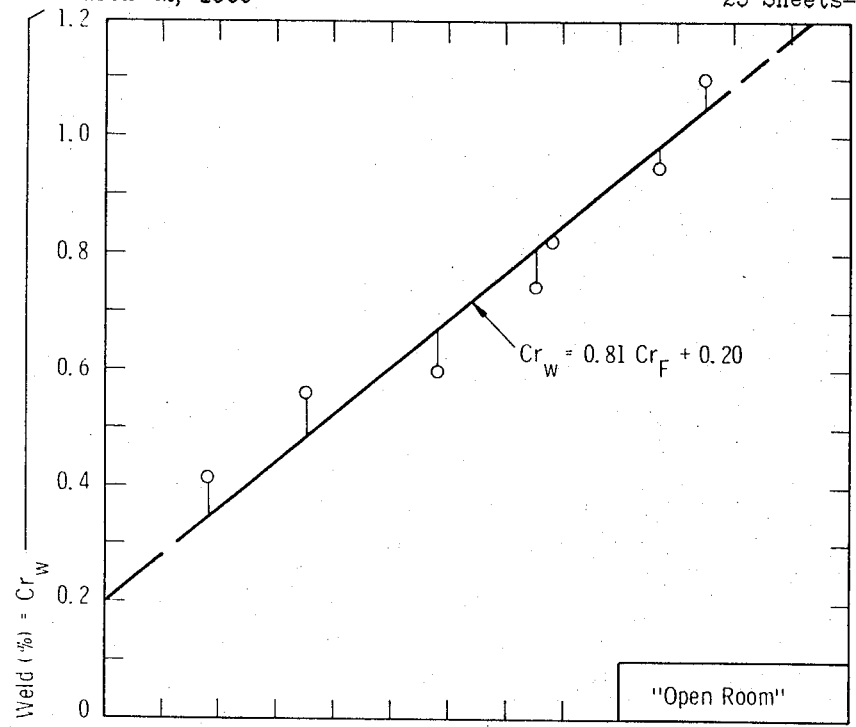
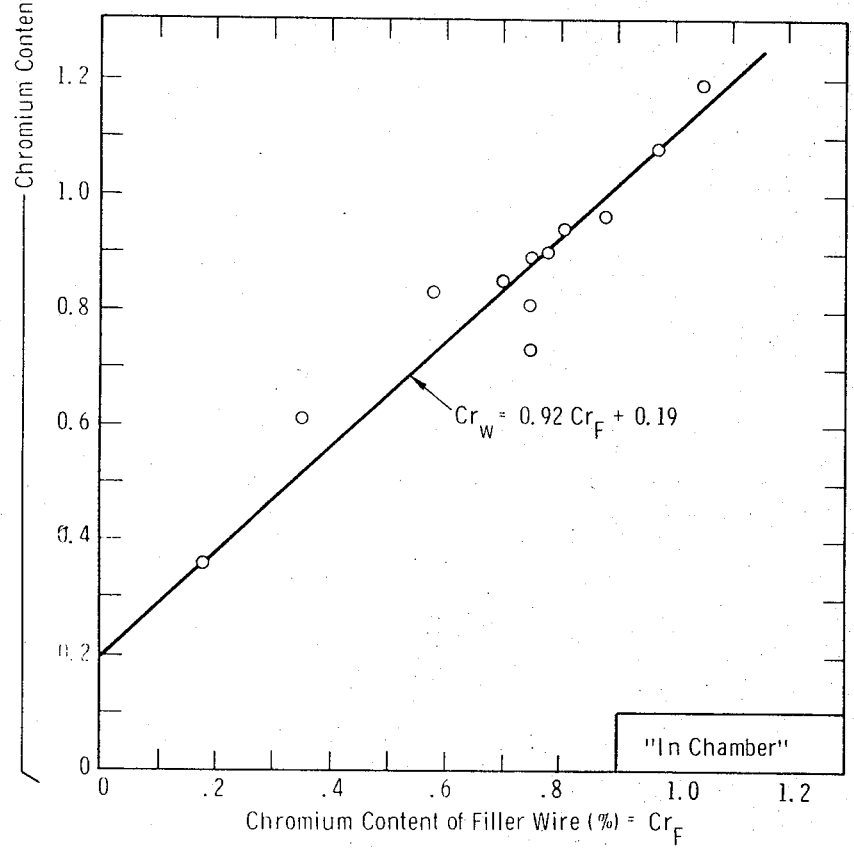
FIG. 20.

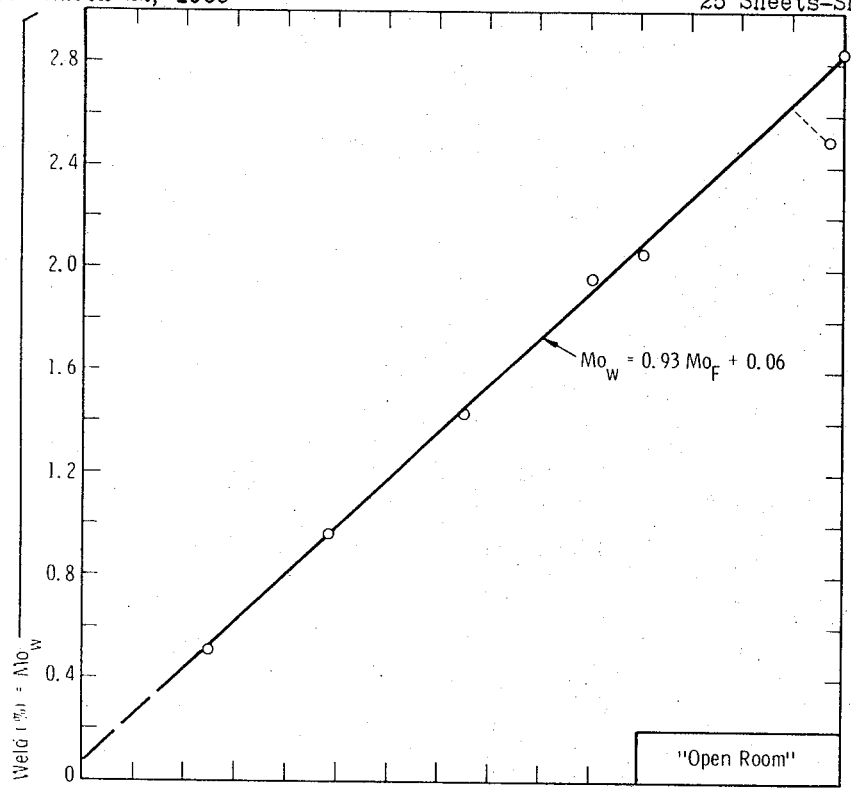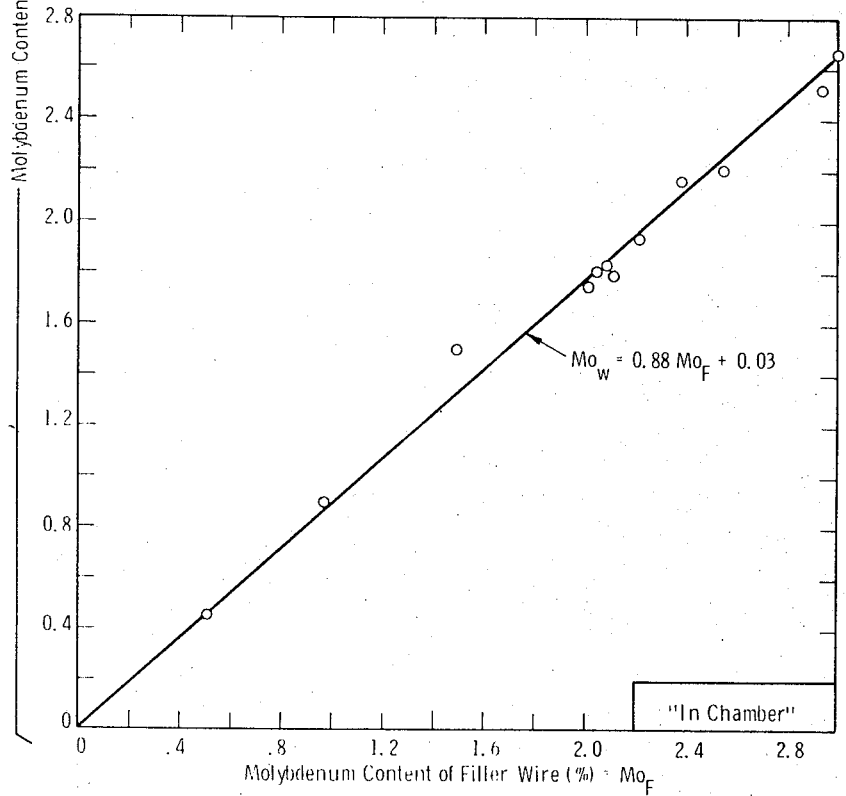
FIG. 21.

3,362,811
WIRE FOR ARC WELDING
Julius Heuschkel, Irwin, Pa., assignor to Westinghouse Electric Corporation, Pittsburgh, Pa., a corporation of Pennsylvania
Filed Mar. 22, 1965, Ser. No. 441,713
8 Claims. (Cl. 75—125)

This invention relates to arc welding and has particular relationship to the welding of high strength materials such as HY80 up to HY150 steels. It is an object of this invention to provide a wire or material for arc welding high strength steels in the use of which high strength, highly ductile, highly tough welded metallurgical joints shall be produced. Specifically, it is one object of this invention to provide such material with which metallurgical joints having a .2% YIELD STRENGTH exceeding 150,000 pounds per square inch shall be produced, without the need for subsequent heat treatment.

High strength ferrous materials are in accordance with the teachings of the art produced by alloying with the iron components which increase the strength. But in welding with materials produced in accordance with the teachings of the prior art the welds produced have manifested relatively low ductility and relatively low toughness. It is an object of this invention to overcome the above-described difficulties of the prior art and to provide material for producing high strength welds which shall also be high in toughness and high in ductility, without the need for heat treatment after their deposition.

In evaluating welds for strength, toughness, and ductility, a block of weld metal is subjected to a series of tests to determine the tensile properties, the ductility, and the toughness. At the start it is desirable to describe how welds are evaluated and to present definitions of the various parameters which serve to measure the strength of materials, the toughness, and the ductility.

To determine the tensile properties, the weld metal is subjected to a tensile stress and the strain developed by the stress is measured. Stress is expressed as loading force per unit cross-sectional area and strain as linear-dimension elongation produced by the stress. The tensile properties are evaluated by determining the stress-strain characteristic of the material. At lower stress, the strain is proportional to the stress; at higher stress the strain departs from proportionality and for still higher stress the material becomes plastic. A stress is ultimately reached at which the material is ruptured.

The specimen is stressed continuously through the rupture point while the loading is recorded by a recording instrument. The tensile properties of the specimen may be derived by inspection of the record.

The PROPORTIONAL LIMIT or ELASTIC LIMIT is defined as the minimum stress at which the stress-strain characteristic departs from proportionality.

The 2/10% YIELD STRENGTH is the stress for which the stress-strain characteristic departs from proportionality by 2/10 of 1%.

The 5/10% YIELD STRENGTH is the stress for which the stress-strain characteristic departs from proportionality by 5/10 of 1%.

As the load applied to a specimen is further increased, its diameter in the region of the stress is reduced. As the loading is further applied, the load reaches a maximum magnitude and then progressively smaller loads cause the specimen to elongate until the specimen is ruptured.

The ULTIMATE STRESS is the maximum load resisted by the work or strain-hardened metal in the specimen divided by the original cross-sectional area. The ULTIMATE STRESS is thus an arbitrary magnitude. The maximum load may be derived from the record on which the loading, during the stressing of the specimen, is recorded. As is stated above after the specimen is subjected to the load corresponding to ULTIMATE STRESS, a progressively smaller load continuously applied causes the specimen to elongate until it is ruptured.

The TRUE FRACTURE STRESS is the final smallest load at which fracture occurs divided by the smallest final area in the region of fracture. This value is usually significantly larger than the ULTIMATE STRESS because the metal has been severely strain-hardened at the region of fracture.

The ductility of the weld metal is evaluated by determining the elongation at two, or more, stages during the stressing and by measuring the reduction in area when the fracture occurs.

The UNIFORM ELONGATION is the percent of increase in unit length of the specimen which occurs up to the point of ULTIMATE STRESS.

The TOTAL ELONGATION is the percent increase in total length of the specimen up to rupture as compared to its original length. A high TOTAL ELONGATION manifests a high ductility. Twenty percent is a reasonably high TOTAL ELONGATION.

The AREA REDUCTION is the difference between the original cross-sectional area of the specimen and the final cross-section area at the rupture point expressed as a percentage of the original cross-section area.

To determine AREA REDUCTION, the minimum area of the ruptured specimen at the rupture point is determined by calculation from the measured final diameter, of a round specimen, or from the measured final width and thickness of a square or rectangular specimen. This minimum area is subtracted from the original cross-sectional area and the difference divided into the original cross-sectional area and quotient multiplied by 100 to arrive at the percentage. A high area reduction manifests high ductility. Seventy-five percent is a high AREA REDUCTION.

The TOUGHNESS of a specimen is evaluated by measuring the charpy V-notch impact values. For this purpose, the specimen is V-notch, — the notch being dimensioned to established standards, — and is ruptured in the region of the notch by dropping a weight suspended as a mass from a pendulum. The energy required to produce the rupture is measured in foot-pounds and is called Charpy Energy. The Charpy Energy is determined at various temperatures. For comparison purposes the energy at +80° F. is used, but for specific purposes some prescribed value may be required at some pre-specified temperature. After rupture, the specimen is studied in the region of the rupture and the proportion of the ruptured area which is brittle, i.e., exhibits cleavage fracture, is determined. High Charpy Energy manifests high toughness. Fifty foot-pounds has, in the past, been regarded as manifesting satisfactory TOUGHNESS at the nominal room temperatures of 70 to 80° F.

The BRITTLE FRACTURE is the percent of brittle area in the specimen after rupture as compared to the total ruptured area. BRITTLE FRACTURE is specified in percent at different temperatures in Fahrenheit degrees. A low BRITTLE FRACTURE component manifests high TOUGHNESS. It is desirable that the BRITTLE FRACTURE component be zero.

The TOUGHNESS is usually presented graphically. Two curves are plotted; one curve showing the Charpy V-notch Energy values in foot-pounds as a function of temperature and the other showing the BRITTLE FRACTURE percent as a function of temperature. The foot-pound curve has a plateau which serves for evaluation purposes. In the BRITTLE FRACTURE curve, the temperature at which the BRITTLE FRACTURE is zero (=FTP=Fracture Transition, Plastic) and the temperature at which it is 50% (=FATT=Fracture Appearance Transition Temperature) are both used in these evaluations.

Customarily, the material is designated in terms of its 2/10% YIELD STRESS. HY-80 is a material whose 2/10% YIELD STRESS is 80,000 pounds per square inch. HY-150 is a material whose 2/10% YIELD STRESS is 150,000 pounds per square inch. This procedure is used because, in general, those materials do not exhibit sharp upper and lower yield "points", as is the case for the less-strong irons and unalloyed low carbon steels.

This invention arises from the discovery that high strength, high ductility, high toughness welds may be produced by arc welding in an atmosphere substantially free of oxygen and nitrogen with a filler material or a consumable electrode having the necessary strenghtening alloying element but having a low content of managanese. The sulfur, phosphorus, oxygen and nitrogen content in the material or electrode should also be maintained low. Specifically, high strength, high toughness, high ductility welds were produced by arc welding in a nitrogen free, oxygen free atmosphere with a non-consumable electrode and with the above-described material as a filler. The necessary freedom from oxygen and nitrogen can be readily obtained by welding in a chamber or dry box. The welding may also be carried on in an open room and in an adequate shield of inert gas such as argon or helium.

In accordance with this invention, a filler material is provided for producing welds having high toughness and high ductility and .2% YIELD STRENGTH up to and exceeding 150,000 pounds per square inch by welding in an atmosphere substantially free of oxygen and nitrogen. This material has a low content of manganese, sulfur, phosphorous, nitrogen and oxygen and has the following composition in percent:

Carbon between .046 and .17
Silicon between .01 and .75
Copper between .52 and 1.23
Nickel between 1.66 and 4.24
Chromium between .35 and .88
Molybdenum between .97 and 2.55
Vanadium between .27 and .67
Tungsten between .00 and .41
Cobalt between .030 and .88
Iron remainder.

It was also found that improved ductility of the weld metal may be achieved with material having the above content except that the silicon does not exceed .04%.

In accordance with a further aspect of this invention, a material for arc welding is provided which when used as filler for arc welding in an atmosphere substantially free of oxygen nad nitrogen is capable of producing high toughness, high ductility welds having a 2/10% YIELD STRENGTH range between about 68,750 pounds per square inch and about 155,500 pounds per square inch. This material has a low content of manganese, sulfur, phosphorus, nitrogen and oxygen and has otherwise the following composition in percent:

Carbon between .0064 and .17
Silicon between 0 and .75
Copper between .091 and 1.23
Nickel between .84 and 4.24
Chromium between .18 and .88
Molybdenum between .51 and 2.55
Vanadium between .13 and .67
Tungsten between 0 and .41
Cobalt between .03 and .88
Iron remainder.

In arriving at this invention, ingots of high purity, vacuum melted, alloy steels having strengthening alloy components over a wide range were produced. Filler welding material was drawn from these ingots. This material was used in depositing weld metal by arc welding with a non-consumable (tungsten) electrode both in a chamber in an atmosphere of pure argon and also in the open room in a continuously flowing shield or atmosphere of argon.

The work, or plate, used in making these welds was of the HY-150 type and had the following composition:

| | |
|---|---:|
| C | .17 |
| Mn | .35 |
| P | .008 |
| S | .009 |
| Si | .22 |
| Cu | .08 |
| Ni | 3.53 |
| Cr | 1.63 |
| Mo | .31 |
| V | .10 |
| Ti | .005 |
| Al Sol. | .0006 |
| Al Insol. | .0041 |
| N | .006 |
| O | .0018 |

The following Table I shows the composition of the ingots from which the filler wire or material used in making U-groove type welds was drawn.

TABLE I.—COMPOSITIONS OF WIRE INGOTS

| Heat No. | C | Mn | P | S | Si | Cu | Ni | Cr | Mo | V | W | Co | N | O |
|---|---|---|---|---|---|---|---|---|---|---|---|---|---|---|
| 572 | 0.099 | .013 | <.0005 | .001 | <.03 | .96 | 3.22 | .69 | 2.01 | .49 | .36 | .77 | .0007 | .0007 |
| 636 | 0.0064 | <0.002 | | | <0.005 | 0.091 | 0.84 | 0.18 | 0.51 | 0.13 | <0.10 | 0.16 | <0.001 | 0.0017 |
| 637 | 0.046 | <0.002 | | | 0.01 | 0.52 | 1.66 | 0.35 | 0.97 | 0.27 | <0.10 | 0.030 | <0.001 | 0.0026 |
| 638 | 0.074 | <0.002 | | | 0.01 | 0.64 | 2.41 | 0.58 | 1.49 | 0.39 | 0.15 | 0.63 | <0.001 | 0.012 |
| 639 | 0.093 | <0.002 | | | 0.02 | 1.00 | 3.32 | 0.75 | 2.08 | 0.51 | 0.23 | 0.81 | <0.001 | 0.0017 |
| 640 | 0.066 | <0.002 | | | 0.04 | 0.76 | 3.57 | 0.78 | 2.21 | 0.56 | 0.26 | 0.88 | <0.001 | 0.0059 |
| 641 | 0.12 | <0.002 | | | 0.02 | 1.23 | 3.92 | 0.81 | 2.38 | 0.62 | 0.32 | 0.72 | <0.001 | 0.0030 |
| 642 | 0.17 | <0.002 | | | 0.01 | 0.95 | 4.24 | 0.88 | 2.55 | 0.67 | 0.41 | 0.78 | <0.001 | 0.0018 |
| 643 | 0.12 | <0.002 | | | 0.05 | 1.30 | 4.42 | 0.97 | 2.94 | 0.71 | 0.43 | 1.08 | <0.001 | 0.0097 |
| 644 | 0.13 | <0.002 | | | 0.05 | 1.61 | 4.94 | 1.05 | 3.00 | 0.75 | 0.44 | 1.10 | <0.001 | 0.0118 |
| 639 | 0.093 | <0.002 | | | 0.02 | 1.00 | 3.32 | 0.75 | 2.08 | 0.50 | 0.23 | 0.81 | <0.001 | 0.0017 |
| 645 | 0.10 | <0.002 | | | 0.27 | 1.04 | 3.35 | 0.70 | 2.11 | 0.50 | 0.22 | 0.79 | <0.001 | 0.0031 |
| 646 | 0.10 | <0.002 | | | 0.50 | 1.00 | 3.34 | 0.75 | 2.04 | 0.50 | 0.24 | 0.52 | <0.001 | 0.0052 |
| 647 | 0.079 | <0.002 | | | 0.75 | 1.05 | 3.36 | 0.75 | 2.01 | 0.51 | 0.24 | 0.82 | <0.001 | 0.011 |

The ingots are identified in Table I by their heat numbers which vary from 572 through 647. In each case, the manganese content is very low, the highest for 572, .013% and the others less than .002%. The content of alloying elements on the whole is increased progressively from heat 637 through heat 647; on the whole 572 has a content between 638 and 639. The heats were prepared with the purpose in mind of obtaining a predetermined progressive variation in the strengthening elements carbon, copper, nickel, chromium, molybdenum, vanadium, cobalt and tungsten. The heat 636, 637 and 638 were prepared to have respectively silicon contents .25, .50 and .75 percent. The silicon content of heat 639 was only .02 percent. Weld metal specimens varying in strengthening alloying components in a known manner were thus obtained.

The materials having the composition disclosed in Table I were used as filler material in welding with a non-consumable electrode in a chamber in an atmosphere of argon and also in welding in the open room with a so-called cold wire feed in a shield of argon. The composition of the weld metal in each case is shown in the following Tables II and III.

TABLE II.—COMPOSITIONS OF WELDS WITHIN CHAMBER IN ARGON ATMOSPHERE

| Heat No. | Weld No. | C | Mn | P | S | Si | Cu | Ni | Cr | Mo | V | W | Co | N | O |
|---|---|---|---|---|---|---|---|---|---|---|---|---|---|---|---|
| 72 | 597 | .10 | .033 | .0003 | .003 | .03 | .96 | 3.46 | 0.79 | 1.82 | .48 | .23 | .68 | .0010 | .0007 |
| 36 | 675 | 0.020 | 0.042 | | | 0.03 | 0.095 | 1.18 | 0.36 | 0.46 | 0.12 | <0.10 | 0.14 | 0.004 | 0.0004 |
| 637 | 676 | 0.056 | 0.055 | | | 0.05 | 0.45 | 2.00 | 0.61 | 0.90 | 0.24 | <0.10 | 0.034 | 0.004 | 0.0008 |
| 638 | 681 | 0.082 | 0.046 | | | 0.16/0.27/0.31 | 0.71 | 2.90 | 0.83 | 1.50 | 0.38 | 0.15 | 0.60 | 0.003 | 0.0005 |
| 639 | 677 | 0.10 | 0.044 | | | <0.03/0.05 | 0.90 | 3.36 | 0.81 | 1.83 | 0.45 | 0.16 | 0.70 | 0.001 | 0.0009 |
| 640 | 678 | 0.068 | 0.037 | | | <0.03/0.07 | 0.67 | 3.53 | 0.90 | 1.94 | 0.50 | 0.23 | 0.77 | 0.004 | 0.0009 |
| 641 | 679 | 0.13 | 0.034 | | | 0.05 | 1.13 | 3.92 | 0.94 | 2.16 | 0.54 | 0.24 | 0.62 | 0.001 | 0.0004 |
| 642 | 680 | 0.16 | 0.042 | | | 0.05 | 0.84 | 4.13 | 0.96 | 2.22 | 0.58 | 0.32 | 0.68 | 0.002 | 0.0004 |
| 643 | 682 | 0.12 | 0.042 | | | 0.07 | 1.14 | 4.33 | 1.08 | 2.52 | 0.62 | 0.36 | 0.96 | <0.001 | 0.0007 |
| 644 | 683 | 0.13 | 0.046 | | | 0.07 | 1.40 | 4.64 | 1.19 | 2.46 | 0.64 | 0.37 | 0.92 | 0.003 | 0.0008 |
| 639 | 677 | 0.10 | 0.044 | | | 0.05 | 0.90 | 3.36 | 0.81 | 1.83 | 0.45 | 0.16 | 0.70 | 0.001 | 0.0009 |
| 645 | 684 | 0.10 | 0.036 | | | 0.19/0.26 | 0.92 | 3.40 | 0.85 | 1.79 | 0.45 | 0.18 | 0.74 | 0.001 | 0.0004 |
| 646 | 685 | 0.10 | 0.039 | | | 0.30/0.41 | 0.88 | 3.41 | 0.89 | 1.81 | 0.44 | 0.22 | 0.46 | <0.001 | 0.0017 |
| 647 | 686 | 0.087 | 0.036 | | | 0.62/0.92 | 0.94 | 3.44 | 0.73 | 1.75 | 0.45 | 0.23 | 0.74 | <0.001 | 0.0010 |

TABLE III.—COMPOSITIONS OF WELDS IN ARGON SHIELD IN OPEN ROOM

| Heat No. | Weld No. | C | Mn | P | S | Si | Cu | Ni | Cr | Mo | V | W | Co | N | O |
|---|---|---|---|---|---|---|---|---|---|---|---|---|---|---|---|
| 636 | 45 | 0.0085 | 0.036 | | | 0.033 | | | | | | | | <0.001 | 0.0044 |
| 636 | 62 | 0.013 | 0.052 | | | 0.033 | | | | | | | | 0.002 | 0.0040 |
| 637 | 44 | 0.032 | 0.022 | | | 0.03 | 0.10 | 1.17 | 0.41 | 0.50 | 0.12 | <0.10 | 0.14 | <0.001 | 0.0009 |
| 637 | 61 | 0.037 | 0.045 | | | 0.02 | | | | | | | | <0.001 | 0.0018 |
| 638 | 48 | 0.055 | 0.028 | | | 0.03 | 0.46 | 1.92 | 0.56 | 0.96 | 0.24 | <0.10 | 0.032 | <0.001 | 0.0012 |
| 639 | 55 | 0.066 | 0.030 | | | <0.03/0.94 | 0.60 | 2.47 | 0.60 | 1.43 | 0.36 | 0.18 | 0.54 | <0.001 | 0.0024 |
| 640 | 47 | 0.059 | 0.031 | | | <0.03/0.08 | 0.59 | 3.54 | 0.82 | 2.06 | 0.51 | 0.31 | 0.81 | 0.002 | 0.0010 |
| 641 | 49 | 0.11 | 0.034 | | | 0.06 | | | | | | | | 0.001 | 0.0007 |
| 642 | 50 | 0.15 | 0.026 | | | 0.049 | 0.89 | 4.20½ | 0.95 | 2.50 | 0.62 | 0.43 | 0.70 | 0.002 | 0.0011 |
| 643 | 51 | 0.11 | 0.027 | | | 0.06 | | | | | | | | <0.001 | 0.0010 |
| 643 | 63 | 0.12 | 0.031 | | | 0.054 | | | | | | | | <0.001 | 0.0009 |
| 644 | 52 | 0.20 | 0.025 | | | 0.04 | 1.51 | 4.77 | 1.10 | 2.84 | 0.69 | 0.47 | 0.98 | 0.001 | 0.0016 |
| 639 | 55 | 0.068 | 0.030 | | | <0.03/0.04 | | | | | | | | 0.001 | 0.0024 |
| 645 | 53 | 0.10 | 0.026 | | | 0.23/0.26 | | | | | | | | 0.002 | 0.0011 |
| 646 | 54 | 0.091 | 0.034 | | | 0.42/0.47 | | | | | | | | 0.002 | 0.0013 |
| 647 | 46 | 0.066 | 0.025 | | | 0.66/0.71 | 1.04 | 3.36 | 0.74 | 1.96 | 0.47 | 0.25 | 0.74 | 0.006 | 0.0018 | to contain 25%, 50% and 75% of the strengthening elements (C, Cu, Ni, Cr, Mo, V, Co, W) of heat 639, respectively. Heats 640, 641, 642, 643 and 644 were prepared to have strengthening content (C, Cu, Ni, Cr, Mo, V, Co, W) 1.1, 1.2, 1.3, 1.4 and 1.5, times the strengthening content of heat 639. Heats 645, 646 and 647 were prepared The chamber weld metals are identified by numbers 597 and 675 through 686 and the open-room weld metals are identified by numbers 45 through 62. The numbers do not correspond consecutively to the ingot number. Certain characteristics of the weld metal composition are presented in the following Table XI.

TABLE XI.—COMMENTS ON WIRE AND WELD COMPOSITIONS

| Heat No. | Weld No. | Comments |
|---|---|---|
| 636 | | C and Cu lower than requested. |
| 637 | | Co not added. |
| 638 | | W lower than requested, also Cu; Co higher. |
| 639 | | W lower than requested. |
| 640 | | C, Cu, and W lower than requested. |
| 641 | | W and Co lower than requested, C higher. |
| 642 | | C and W higher, and Cu lower than requested. |
| 643 | | Cu lower than requested. |
| 644 | | All wire data normalized to this (1.5) base. |
| 645 | | W lower than requested; C higher. |
| 646 | | W lower than requested; C higher; Co lower. |
| 647 | | W lower than requested; Co higher. |
| 636 | 675 | Cu low due to wire; Ni, Cr, and Mo higher. |
| 637 | 676 | Co missing due to wire; Ni, Cr, and Mo higher. |
| 638 | 681 | C, Ni, Cr, and Mo higher, W low. |
| 639 | 677 | C and Co high, W low. |
| 640 | 678 | C, Cu and W low due to wire analysis; Co high. |
| 641 | 679 | C high, W and Co low; Mo high. |
| 642 | 680 | C extra high, Cu and Co low. |
| 643 | 682 | Cu low, Co high. |
| 644 | 683 | All weld metals normalized to this (1.5) base. |
| 645 | 684 | W low, Co and C high. |
| 646 | 685 | Co and W low; C high. |
| 647 | 686 | Co high. |
| 636 | 45 | C low due to wire. |
| | 62 | Cu low due to wire; Ni high. |
| 637 | 44 | C low. |
| | 61 | Co missing due to wire; Ni and Cr high. |
| 638 | 48 | C and Cu low; Mo and Co high. |
| 639 | 55 | C low. |
| 640 | 47 | C and Cu low, W, Mo and Co high. |
| 641 | 49 | |
| 642 | 50 | C, Mo, V, and W high, Co and Cu low. |
| 643 | 51 | C low. |
| | 63 | |
| 644 | 52 | C, Cu, Mo, V and W high; Cr low. |
| 645 | 53 | C high. |
| 646 | 54 | |
| 647 | 46 | C low; Cu, Mo and Co high. |

The parameters used in welding and the characteristics of the arc and the radiographic quality of the welds are presented in Table IV for in chamber welds and Table V for open room welds.

TABLE IV.—WELDING PARAMETERS CHAMBER WELDS

| Heat No. | Weld No. | Arc Energy | | | No. of Beads | Travel Speed (in./min.) | Arc Action | Radiographs |
|---|---|---|---|---|---|---|---|---|
| | | Amps. | Volts | Joules/In/Bead, avg. | | | | |
| 572 | 597 | 300–380 | 10–12 | 40,800 | 18 | 5–6 | Good | Sound. |
| 636 | 675 | 370 | 9.5 | 53,000 | 9 with 3/16; 10 with 3 1/16; 19 total | 4 | Slight arc blow first 3 passes. | Sound.[1] |
| 637 | 676 | 370 | 9.5 | 53,000 | 19 { 9 flat; 10 φ } | 4 | Good[2] | Do. |
| 638 | 681 | 372 | 9.2 | 51,300 | 20 | 4 | do.[2] | Do. |
| 639 | 677 | 372 | 9.5 | 53,000 | 20 | 4 | do.[2] | Do. |
| 640 | 678 | 375 | 9.7 | 54,500 | 20 | 4 | do.[2] | Do. |
| 641 | 679 | 375 | 9.7 | 54,500 | 20 | 4 | do.[2] | Do. |
| 642 | 680 | 375 | 9.7 | 54,500 | 20 | 4 | do.[2] | Do. |
| 643 | 682 | 372 | 9.2 | 51,300 | 20 | 4 | do.[2] | Do. |
| 644 | 683 | 390 | 9.5 | 55,500 | 19 | 4 | do.[2] | 1 Void. 1" From End. |
| 645 | 684 | 390 | 9.5 | 55,500 | 20 | 4 | do.[2] | Sound. |
| 646 | 685 | 387 | 9.5 | 55,000 | 20 | 4 | do.[2] | Do. |
| 647 | 686 | 370 | 9.5 | 53,000 | 20 | 4 | do.[2] | Do. |

[1] Except starts and stops.  [2] Some arc blow first 3 passes at weld end.

TABLE V.—WELDING PARAMETERS—OPEN ROOM WELDS

| Heat No. | Weld No. | Arc Energy | | | No. of Beads | Travel Speed (in./min.) | Arc Action | Radiographs |
|---|---|---|---|---|---|---|---|---|
| | | Amps. | Volts | Joules/In/Bead, avg. | | | | |
| 636 | 45 | 335 | 12.6 | 50,500 | 21 | 5 | Good | Porosity. |
| | 62 | 425 | 12.8 | 72,500 | 17 | 4.5 | Erratic wire | Do. |
| 637 | 44 | 335 | 12.6 | 42,160 | 21 | 6 | Good | Do. |
| | 61 | 415 | 12.5 | 62,300 | 19 | 5 | Arc blow | Do. |
| 638 | 48 | 335 | 11.6 | 46,700 | 21 | 5 | Erratic (wire?) | Do. |
| 639 | 55 | 415 | 11.7 | 58,300 | 19 | 5 | Erratic | Do. |
| 640 | 47 | 335 | 11.1 | 44,600 | 21 | 5 | Good | Do. |
| 641 | 49 | 335 | 11.6 | 46,700 | 20 | 5 | do | Do. |
| 642 | 50 | 335 | 12.0 | 48,300 | 20 | 5 | Gas evolution | Do. |
| 643 | 51 | 335 | 11.1 | 37,200 | 20 | 6 | Good | Do. |
| | 63 | 400 | 12.7 | 50,900 | 21 | 6 | do | Do. |
| 644 | 52 | 335 | 10.9 | 43,800 | 20 | 5 | Gas evol., poor flow. | Do. |
| 645 | 53 | 335 | 10.7 | 43,000 | 20 | 5 | Good flow, gas evol. | Do. |
| 646 | 54 | 400 | 11.3 | 54,300 | 20 | 5 | Good | Do. |
| 647 | 46 | 335 | 11.1 | 44,700 | 20 | 5 | Small slag spots | Do. |
| 560 | 38 | 335 | 11.9 | 39,800 | 21 | 6 | Good | Sound. |

The open room welds were found to be radiographically porous while the chamber welds were almost uniformly sound. The porosity was caused by inadequate shielding. The soundness of the in-chamber welds establishes that with adequate shielding the open-room welds would also have been sound and free of porosity.

It is seen that the hardness increases as the alloy content increases. The open-room welds of high alloy content 641 through 644 are of a higher hardness than corresponding in-chamber welds. The open-room welds with varying silicon content also have a higher hardness than the in-chamber weld.

TABLE VII.—IMPACT DATA FROM CHAMBER AS-DEPOSITED (UNANNEALED) WELD METALS

| Vac. Melt Wire No. | Weld No. | Energy (ft.-lbs. at °F. Temp. Listed) | | | | | | | | Brittle Fracture (Percent at °F. Temp. Listed) Energy | | | | | | | |
|---|---|---|---|---|---|---|---|---|---|---|---|---|---|---|---|---|---|
| | | −275 | −200 | −140 | −80 | −40 | 0 | +80 | +200 | −275 | −200 | −140 | −80 | −40 | 0 | +80 | +200 |
| 572 | 597 | | | | 153.0 | 189 | | 200.0 | 222.0 | | 98 | | 0 | 0 | | 0 | 0 |
| 636 | 675 | | 6.0 | 10.0 | 239.5 | | 239.0 | 238.5 | 239.0 | | 100 | 100 | 0 | | 0 | 0 | 0 |
| 637 | 676 | | 96.5 | 24.5 | 238.0 | | 239.2 | 238.5 | 239.5 | | 90 | 95 | 0 | | 0 | 0 | 0 |
| 638 | 681 | | 15.0 | 32.0 | 196.5 | 190.0 | 239.5 | 229.0 | | | 100 | | 90 | 0 | 0 | 0 | 0 |
| 639 | 677 | | 5.5 | | 42.0 | 58.0 | 200.0 | 183.5 | 167.0 | | 95 | | 80 | 45 | 0 | 0 | 0 |
| 640 | 678 | | 100.0 | 15.0 | 229.5 | | 217.0 | 238.5 | 212.0 | | 70 | 95 | 0 | | 0 | 0 | 0 |
| 641 | 679 | | 101.0 | 29.0 | 170.0 | | 168.5 | 178.0 | 187.0 | | 60 | 75 | 0 | | 0 | 0 | 0 |
| 642 | 680 | | 93.0 | | 139.0 | | 135.0 | 157.0 | 150.5 | | 0 | | 0 | | 0 | 0 | 0 |
| 643 | 682 | 9.0 | 4.5 | | 32.5 | | 99.0/127.5 | 76.0 | 126.5 | 95 | 100 | | 85 | | 35/0 | 50 | 0 |
| 644 | 683 | | 12.5 | | 33.5 | 28.5 | 132.5 | 132.0 | 105.0 | | 90 | | 80 | 75 | 0 | 0 | 0 |
| 639 | 677 | | 5.5 | | 42.0 | 58.0 | 200.0 | 183.5 | 167.0 | | 95 | | 80 | 45 | 0 | 0 | 0 |
| 645 | 684 | | 31.5 | | 52.0 | 135.5 | 141.5 | 174.0 | 186.0 | | 90 | | 65 | 10 | 10 | 0 | 0 |
| 646 | 685 | | 11.5 | | 65.0 | 120.0 | 151.0 | 169.0 | 173.0 | | 100 | | 50 | 10 | 0 | 0 | 0 |
| 647 | 686 | 20.0 | 105.5 | | 166.0 | | 178.5 | 206.0 | 207.5 | 98 | 30 | | 0 | | 0 | 0 | 0 |
| | | | | −120 | | | | | | | | −120 | | | | | |

Table VI presents the hardness DPH number, for the various welds.

TABLE VI.—HARDNESS DATA AS DEPOSITED WELD METAL

| Heat No. | "In-Chamber" | | "Open Room" | |
|---|---|---|---|---|
| | Weld No. | DPH | Weld No. | DPH |
| 636 | 675 | 190 | 45 | 163 |
| | | | 62 | 169 |
| 637 | 676 | 288 | 44 | 268 |
| | | | 61 | 263 |
| 638 | 681 | 367 | 48 | 319 |
| 639 | 677 | 395 | 55 | 373 |
| 640 | 678 | 322 | 47 | 376 |
| 641 | 679 | 390 | 49 | 421 |
| 642 | 680 | 406 | 50 | 433 |
| 643 | 682 | 393 | 51 | 417 |
| | | | 63 | 405 |
| 644 | 683 | 398 | 52 | 433 |
| 645 | 684 | 384 | 53 | 405 |
| 646 | 685 | 384 | 54 | 417 |
| 647 | 686 | 384 | 46 | 390 |

Table VII presents the impact data in Charpy Energy in foot pounds at various temperatures for the various in-chamber welds. The Charpy Energy is seen to be unusually high. For example at zero degrees Fahrenheit, the energy varies between 99 foot pounds for weld number 682 and 239 foot pounds for weld number 676. In this group the weld 680 has the highest alloy content. At minus 80° the Charpy Energy is unusually high except for welds 681, 677, 682, 683, 684, 685 which are between 32 and 65 foot pounds respectively. The BRITTLE FRACTURE in percentage is correspondingly satisfactory. Except for welds 681, 677, 682, 683, 684, 685 at minus 80 and for 677, 671, 684, 685 at minus 40 the BRITTLE FRACTURE percentage is zero at these temperatures. Judged by the data at −80° F. welds 597, 675, 676, 678, 679, 680, 686 are high toughness welds.

The impact data for the open-room welds is presented in the following Table VIII.

TABLE VIII.—IMPACT DATA FROM OPEN-ROOM AS DEPOSITED (UNANNEALED) WELD METALS

| Arc Environment | Vac. Melt Wire No. | Weld No. | Energy (ft.-lbs. at °F. Temp. Listed) | | | | | | | | Brittle Fracture (Percent at °F. Temp. Listed) Energy | | | | | | | |
|---|---|---|---|---|---|---|---|---|---|---|---|---|---|---|---|---|---|---|
| | | | −275 | −200 | −140 | −80 | −40 | 0 | +80 | +200 | −275 | −200 | −140 | −80 | −40 | 0 | +80 | +200 |
| In Open Room | 636 | 45 | | 5.0 | 13.5 | 239.5 | | 239.5 | 239.2 | 239.5 | | 100 | 100 | 0 | | 0 | 0 | 0 |
| | | ¹62 | | | 9.0 | 33.5 | ²239.5 | ²239.5 | 239.5 | | | | 98 | 90 | ²0 | ¹0 | 0 | |
| | 637 | 44 | | 4.0 | 184.0 | 239.5 | | 239.5 | 239.5 | 237.0 | | 100 | 35 | 0 | | 0 | 0 | 0 |
| | | ¹61 | | | 15.0 | 11.0 | ²235.5 | ²239.5 | 239.5 | | | | 98 | 98 | ²0 | ¹0 | 0 | |
| | 638 | 48 | | 7.0 | 9.0 | 14.5 | | 93.0 | 149.0 | 145.0 | | 100 | 95 | 95 | | 60 | 0 | 0 |
| | 639 | 55 | | 5.0 | 18.5 | 9.0 | | 59.0 | 74.0 | 149.5 | | 98 | 95 | 95 | | 70 | 35 | 0 |
| | 640 | 47 | | 20.5 | 21.5 | 49.0 | | 114.0 | 179.0 | 151.0 | | 100 | 98 | 95 | | 65 | 0 | 0 |
| | 641 | 49 | | 13.0 | 14.5 | 31.5 | | 93.0 | 117.5 | 103.0 | | 98 | 98 | 95 | | 10 | 0 | 0 |
| | 642 | 50 | | 36.0 | 45.5 | 37.5 | | 79.5 | 100.0 | 101.0 | | 90 | 70 | 90 | | 30 | 0 | 0 |
| | 643 | 51 | | 7.0 | 19.5 | 20.0 | | 35.0 | 37.0 | 102.0 | | 100 | 95 | 95 | | 70 | 65 | 0 |
| | | 63 | | 10.0 | 20.5 | 30.0 | | 58.5 | 117.5 | | | 100 | 95 | 90 | | 40 | 0 | |
| | 644 | 52 | | 7.5 | 10.5 | 15.5 | | 22.0 | 61.0 | 89.0 | | 100 | 100 | 98 | | 95 | 20 | 0 |
| Nominal Silicon: | | | | | | | | | | | | | | | | | | |
| .00 | 639 | 55 | | 5.0 | 18.5 | 9.0 | | 59.0 | 74.0 | 149.5 | | 98 | 95 | 95 | | 70 | 35 | 0 |
| .25 | 645 | 53 | | 16.0 | 20.0 | 23.0 | | 32.5 | 73.0 | 90.5 | | 100 | 95 | 95 | | 90 | 40 | 0 |
| .50 | 646 | 54 | | 4.0 | 9.0 | 8.0 | | 38.5 | 104.0 | 154.0 | | 100 | 95 | 95 | | 80 | 25 | 0 |
| .75 | 647 | 46 | | 8.0 | 8.5 | 12.0 | | 51.0 | 49.0 | 127.0 | | 100 | 98 | 90 | | 80 | 65 | 0 |

¹ At −60° F., weld 62=239.5 ft.-lbs. with 0% brittle fracture; weld 61=24.5 ft.-lbs. with 0% brittle fracture.
² −30° F.
³ +20° F.

This data is not as high as for the in-chamber welds but is substantial compared to similar data for prior art welds. For example, at zero degrees the Charpy Energy for weld 48 is 93 and for weld 55 it is 59; for weld 47 it is 114 and for weld 49 is 93. Such high impact values for open-room welds of high strength metals has not heretofore been obtained.

The tensile strength and ductility data for the in-chamber and open-room welds are presented in the following Tables IX and X respectively.

TABLE IX.—TENSILE DATA FROM CHAMBER AS-DEPOSITED (UNANNEALED) WELD METALS

| Vac. Melt Wire Heat No. | Weld No. | Tensile Stress (p.s.i.) | | | | | Stress Ratios | | | | | Ductility (Percent) | | |
|---|---|---|---|---|---|---|---|---|---|---|---|---|---|---|
| | | Prop. Limit | 0.2% Yield | 0.5% Yield | Ultimate | True Fracture | 0.2 Y P.L. | 0.5 Y P.L. | U.T.S. P.L. | T.F.S. P.L. | U.T.S. 0.2 Y | Unif. Elong. | Total Elong. | Area Reduction |
| 572 | 597 | 137,500 | 152,300 | 157,300 | 166,750 | 352,300 | 0.980 | 0.931 | 1.033 | 3.542 | 1.056 | 5.38 | 20.85 | 78.60 |
| 636 | 675 | 70,200 | 68,750 | 65,500 | 72,500 | 249,000 | 1.010 | 1.008 | 1.053 | 2.775 | 1.042 | 9.55 | 31.66 | 89.40 |
| 637 | 676 | 114,200 | 115,800 | 115,200 | 120,600 | 317,600 | 1.130 | 1.147 | 1.202 | 2.900 | 1.065 | 7.50 | 25.83 | 83.00 |
| 638 | 681 | 121,800 | 137,400 | 139,500 | 146,300 | 352,400 | 1.110 | 1.131 | 1.195 | 2.650 | 1.077 | 6.55 | 23.92 | 82.40 |
| 639 | 677 | 128,250 | 142,300 | 145,200 | 153,300 | 340,000 | 1.090 | 1.104 | 1.170 | 2.770 | 1.075 | 6.00 | 22.50 | 79.15 |
| 640 | 678 | 117,500 | 128,000 | 129,900 | 143,000 | 325,600 | 1.141 | 1.179 | 1.295 | 2.895 | 1.135 | 6.35 | 23.52 | 83.60 |
| 641 | 679 | 121,200 | 138,500 | 143,000 | 157,200 | 351,000 | 1.092 | 1.108 | 1.170 | 2.382 | 1.072 | 6.70 | 23.40 | 79.60 |
| 642 | 680 | 142,250 | 155,500 | 157,700 | 166,800 | 339,500 | 1.192 | 1.235 | 1.322 | 2.619 | 1.109 | 5.93 | 21.23 | 76.60 |
| 643 | 682 | 123,700 | 147,300 | 152,900 | 163,200 | 323,600 | 1.145 | 1.172 | 1.248 | 2.480 | 1.087 | 5.74 | 20.42 | 73.80 |
| 644 | 683 | 130,250 | 149,200 | 152,900 | 162,300 | 323,200 | | | | | | 5.78 | 19.50 | 73.35 |
| 639 | 677 | 128,250 | 142,300 | 145,200 | 153,300 | 340,000 | 1.110 | 1.131 | 1.195 | 2.650 | 1.077 | 6.00 | 22.50 | 79.15 |
| 645 | 684 | 134,250 | 150,300 | 153,300 | 160,500 | 359,500 | 1.120 | 1.140 | 1.195 | 2.678 | 1.067 | 5.83 | 22.55 | 79.20 |
| 646 | 685 | 130,300 | 150,300 | 153,300 | 161,700 | 323,500 | 1.152 | 1.175 | 1.238 | 2.480 | 1.073 | 4.92 | 19.24 | 76.20 |
| 647 | 686 | 115,200 | 128,300 | 134,250 | 144,700 | 299,000 | 1.113 | 1.168 | 1.255 | 2.600 | 1.125 | 4.74 | 18.70 | 76.60 |
| Average of 12 | | | | | | | 1.106 | 1.125 | 1.198 | 2.731 | 1.082 | | | |

TABLE X.—TENSILE DATA FROM OPEN-ROOM AS-DEPOSITED (UNANNEALED) WELD METALS

| Arc Environment | Vac. Melt Wire Heat No. | Weld No. | Tensile Stresses (p.s.i.) | | | | | Stress Ratios | | | | | Ductility (percent) | | |
|---|---|---|---|---|---|---|---|---|---|---|---|---|---|---|---|
| | | | Prop. Limit | 0.2% Yield | 0.5% Yield | Ultimate | True Fracture | 0.2 Y P.L. | 0.5 Y P.L. | U.T.S. P.L. | T.F.S. P.L. | U.T.S. 0.2 Y | Unif. Elong. | Total Elong. | Area Reduction |
| In Open Room | 636 | 45 | 59,150 | 58,300 | 59,300 | 66,550 | 141,000 | 0.985 | 1.002 | 1.123 | 2.380 | 1.143 | 7.55 | 19.80 | 77.20 |
| | | 62 | 60,100 | 58,500 | 58,300 | 68,200 | 247,700 | 0.973 | 0.969 | 1.133 | 4.120 | 1.168 | 9.92 | 27.70 | 88.70 |
| | 637 | 44 | 99,400 | 105,200 | 105,800 | 111,250 | 306,500 | 1.060 | 1.061 | 1.120 | 3.080 | 1.057 | 6.50 | 23.27 | 84.60 |
| | | 61 | 101,200 | 105,200 | 105,800 | 111,250 | 289,500 | 1.040 | 1.042 | 1.100 | 2.860 | 1.057 | 6.50 | 22.20 | 83.70 |
| | 638 | 48 | 124,250 | 135,800 | 137,300 | 140,750 | 177,000 | 1.090 | 1.103 | 1.130 | 1.423 | 1.036 | 5.20 | 14.60 | 46.80 |
| | 639 | 55 | 124,300 | 142,300 | 145,300 | 150,200 | 299,800 | 1.142 | 1.170 | 1.208 | 2.405 | 1.055 | 4.58 | 19.04 | 75.10 |
| | 640 | 47 | 125,400 | 142,200 | 145,200 | 149,750 | 215,000 | 1.138 | 1.160 | 1.194 | 1.718 | 1.052 | 4.47 | 11.30 | 48.80 |
| | 641 | 49 | 142,300 | 165,300 | 170,500 | 176,300 | 286,500 | 1.160 | 1.198 | 1.239 | 2.015 | 1.066 | 4.75 | 17.85 | 63.60 |
| | 642 | 50 | 151,300 | 172,300 | 179,000 | 185,750 | 315,600 | 1.140 | 1.185 | 1.228 | 2.085 | 1.076 | 5.20 | 18.20 | 65.40 |
| | 643 | 51 | 140,300 | 161,500 | 169,200 | 177,250 | 323,800 | 1.150 | 1.205 | 1.262 | 2.318 | 1.097 | 4.60 | 18.57 | 71.60 |
| | | 63 | 133,000 | 153,800 | 161,200 | 171,750 | 296,800 | 1.152 | 1.210 | 1.290 | 2.230 | 1.118 | 4.44 | 17.20 | 66.90 |
| | 644 | 52 | 136,750 | 163,500 | 170,250 | 176,500 | 299,500 | 1.198 | 1.249 | 1.292 | 2.195 | 1.080 | 4.10 | 13.40 | 59.90 |
| Nominal Silicon: | | | | | | | | | | | | | | | |
| .00 | 639 | 55 | 124,300 | 142,300 | 145,300 | 150,200 | 299,800 | 1.142 | 1.170 | 1.208 | 2.405 | 1.055 | 4.58 | 19.04 | 75.10 |
| .25 | 645 | 53 | 142,300 | 158,300 | 162,300 | 167,900 | 285,600 | 1.112 | 1.141 | 1.179 | 2.002 | 1.059 | 5.18 | 12.06 | 51.60 |
| .50 | 646 | 54 | 139,000 | 159,000 | 163,300 | 168,750 | 321,000 | 1.143 | 1.172 | 1.211 | 2.320 | 1.060 | 4.98 | 18.27 | 70.10 |
| .75 | 647 | 46 | 130,250 | 150,300 | 156,300 | 164,300 | 223,000 | 1.152 | 1.200 | 1.260 | 1.710 | 1.092 | 4.14 | 11.13 | 46.80 |
| Average of 15 | | | | | | | | 1.109 | 1.138 | 1.198 | 2.324 | 1.081 | | | |

Welds 597, 676, 681, 677, 679, 680 and 686 have a 2/10% YIELD STRENGTH exceeding 100,000 pounds per square inch. These welds, except for 686, also have a total-elongation which substantially exceeds 20% and all including 686 have an area reduction which substantially exceeds 75%. Of these welds 597, 676, 678, 679, 680 and 686 also have unusually high impact values and on the whole zero BRITTLE FRACTURE percentages. It is established that the wires of the compositions involved produce high strength, high toughness and high ductility welds. Welds 597, 676, 678, 679, 680 and 686 are made from the wires drawn from ingots 572, 637, 640, 641, 642, and 647. The corresponding open room welds 44, 61, 48, 55, 47, 49, 55, 54 and 56 manifest similar properties. The strength exceeds the 2/10% YIELD STRENGTH 100,000 pounds per square inch, the total elongation while not as high as for the in-chamber welds is substantial varying between 11.13 and 27.70 and the area reduction is correspondingly high.

Welds 597, 676, 681, 677, 679 and 680 manifest the most desirable properties in high strength, high toughness, and high ductility. For these welds the weld material, usually as filler wire, should have low nitrogen, low oxygen, low phosphorus and low sulfur and the following composition in percent:

C—between .046 and .17
Mn—not greater than .013
Si—between .01 and .04
Cu—between .52 and 1.23
Ni—between 1.66 and 4.24
Cr—between .35 and .88
Mo—between .97 and 2.55
V—between .27 and .67
W—not greater than .41
Co—between .030 and .88
Iron—remainder.

High-strength and high toughness but somewhat less ductility was manifested by weld 686 made from ingot 647. To achieve such welds the weld material may have the same composition as above except that the Si may be as high as .75.

Table IX shows that the weld metals which have a .2% YIELD STRENGTH exceeding 150,000 pounds per square inch, total elongation exceeding 20% and area reduction exceeding 75% are: 597, 680, 684, and 685.

These welds are derived from ingots: 572, 642, 645, and 646.

Of the above weld metals only 597 and 680 have high toughness at −80° F.

Thus, the following wire compositions in percent produce welds having .2% YIELD STRENGTH exceeding 150,000 per square inch, high toughness and high ductility:

C—between .099 and .17
Mn—up to .013
Si—between .01 and .03
Cu—between .95 and .96
Ni—between 3.22 and 4.24
Cr—between .69 and .88
Mo—between 2.01 and 2.55
V—between .49 and .67
W—between .36 and .41
Co—between .77 and .78.

The compositions of wire in percent for .2% YIELD STRENGTH exceeding 150,000 p.s.i. and high ductility and substantial toughness (645–52 at —80° F.; 646–65 at —80° F.) is as follows:

C—between .099 and .17
Mn—up to .013
Si—between .01 and .50
Cu—between .95 and 1.04
Ni—between 3.22 and 4.24
Cr—between .69 and .88
Mo—between 2.01 and 2.55
V—between .49 and .67
W—between .22 and .41
Co—between .52 and .78

In many situations, it is desirable that the weld metal meet the following conditions:

.2% YIELD STRENGTH—at least 150,000

The following weld metals and corresponding ingo meet these conditions:

| Weld Metal | Ingo |
|---|---|
| 597 | 57 |
| 676 | 63 |
| 681 | ¹63 |
| 677 | ¹63 |
| 678 | 64 |
| 679 | 64 |
| 680 | 64 |
| 684 | 64 |

¹ Extrapolated.

Welds meeting the above conditions may then be pr duced by welding in a low oxygen, low nitrogen atmo phere with filler metal having low manganese, phosphoru sulfur, nitrogen and oxygen and the following compositic in percent:

C—.046 to .17
Si—no more than .27
Cu—.52 to 1.23
Ni—1.66 to 4.24
Cr—.35 to .88
Mo—.97 to 2.55
V—.27 to .67
W—not more than .41
Co—.030 to .99
Fe—Remainder.

TABLE XII.—TEMPERATURE DEPENDENCE OF UNNOTCHED TENSILE PROPERTIES

| Test Temp. (°F.) | Wire Heat No. | Weld No. | Tensile Stresses (p.s.i.) | | | | | Tensile Stresses (as ratio of 80° F. value) | | | | | Ductility (percent) | | |
|---|---|---|---|---|---|---|---|---|---|---|---|---|---|---|---|
| | | | Prop. Limit | 0.2% Yield | 0.5% Yield | Ultimate | True Fracture | Prop. Limit | 0.2% Yield | 0.5% Yield | Ultimate | Fracture | Unif. Elong. | Total Elong. | Area Redi tior |
| —200 | 639 | 677 | 148,200 | 160,300 | 166,000 | 180,400 | 340,500 | 1.57 | 1.125 | 1.142 | 1.175 | 1.00 | 7.05 | 24.00 | 73. |
| | 645 | 684 | 152,300 | 167,500 | 174,000 | 189,200 | 341,000 | 1.135 | 1.115 | 1.132 | 1.180 | 0.95 | 6.95 | 21.80 | 67. |
| | 646 | 685 | 148,200 | 161,000 | 169,500 | 187,500 | 295,000 | 1.140 | 1.070 | 1.105 | 1.162 | 0.91 | 4.05 | 17.00 | 63. |
| | 647 | 686 | 133,000 | 144,700 | 150,700 | 169,500 | 356,500 | 1.155 | 1.125 | 1.120 | 1.174 | 1.19 | 7.00 | 23.00 | 76. |
| Average | | | | | | | | 1.147 | 1.109 | 1.125 | 1.173 | 1.012 | 6.26 | 21.45 | 70. |
| —320 | 636 | 675 | 154,250 | *152,600 | *147,200 | 154,700 | 194,000 | 2.20 | 2.22 | 2.25 | 2.13 | 0.78 | *0.04 | 9.45 | 36. |
| | 637 | 676 | 168,250 | *175,000 | *174,000 | 175,000 | 194,200 | 1.47 | 1.52 | 1.51 | 1.45 | 0.61 | *0.20 | 17.15 | 37. |
| | 647 | 680 | 170,750 | 197,200 | 204,200 | 227,700 | 369,000 | 1.20 | 1.27 | 1.30 | 1.36 | 1.09 | 9.63 | 21.10 | 57. |
| —452 | 636 | 675 | 170,300 | | | | 179,500 | 2.43 | | | | 0.72 | | 1.70 | 04 |
| | 637 | 676 | 215,400 | | | | 299,000 | 1.88 | | | | 0.94 | | 4.50 | 40 |
| | 642 | 680 | 237,600 | | | 255,800 | 443,600 | 1.67 | | | 1.53 | 1.31 | | 7.40 | 50 |
| | 647 | 686 | 224,500 | | | 237,000 | 397,000 | 1.95 | | | 1.64 | 1.33 | 0.20 | 8.97 | 52 |

* Exhibited upper yield point.

Total Elongation—at least 20%
Area Reduction—at least 75%
Charpy Energy—at least 50 ft. pounds.

The following welds meet at least these conditions: 597, 680, and 684.

The corresponding ingots are: 572, 642, and 645.

The following compositions in percent of filler wire or like material then meet the above conditions:

C—.099 to .17
Si—.03 to .27
Co—.95 to 1.04
Ni—3.22 to 4.24
Cr—.69 to .88
Mo—2.01 to 2.55
V—.49 to .67
W—.22 to .41
Co—.77 to .78
Fe—Remainder.

In many situations, it is desirable that the weld metal meet the above conditions except that the .2% YIELD STRENGTH may be 100,000 pounds per square inch.

Table XII presents the tensile data and the data ductility for certain of the in-chamber welds at diffe ent low temperatures varying over the range betwe minus 200° F. and minus 450° F. The tensile streng increases substantially as the temperature is decreas and while the total elongation and area reduction remai substantial they are lower than the corresponding data 80° F.

The features of this invention are disclosed above wi reference to the tables showing the compositions of t wire according to this invention, the composition and t related properties of welds produced with this wire in t practice of this invention. For a better understanding this invention, both as to its organization, and as to method of operation, together with additional objects a advantages thereof, reference is made to the followi graphs and to the following drawings in which:

FIGS. 16 through 24 are graphs showing the relationship between the contents of each of the respective alloying components in the filler material used in the welding and in the weld metal itself.

In each of FIGS. 1 through 12 the Charpy Energy in foot pounds is plotted as a function of temperature. Each of these graphs covers the impact data for the in-chamber weld metal and open-room weld metal produced with one of the ingots whose composition is tabulated in Table I. Foot-pounds required to rupture a specimen is in each graph of FIGS. 1 through 12 plotted as ordinate and the temperature at which the rupture takes place as abscissa. In each graph the heat member and the weld numbers for both the open-room and the in-chamber weld metals are shown in the right hand corner. As indicated the points for the open-room weld metal are represented by either solid or open circle and the points for the in-chamber weld metal are represented by small open triangles. Above the center on the right each graph shows the 2/10% YIELD STRENGTH at 80° F. for the corresponding weld metal and heat number. The impact requirements of the specifications of the United States Navy in 1960 at about −60° F. and +80° F. are represented by the shaded angles adjacent and to the left of the labeling of the heat number and weld numbers in each case.

Each curve is of rectangular form having a knee at a predetermined temperature and dropping to low energy in foot-pounds for lower temperatures than the knee. The knees of the curves at higher temperatures the higher the alloy content of the material, but in substantially all cases the impact energy for temperatures above those at the knees are unusually high. The curves also show that for heats 636 through 641 and 645, 646, 647 the in-chamber welds have very high impact energies for temperatures above the knee temperatures and depending on the alloy content the knee occurs at relatively low temperatures. The extent to which the impact energies exceed the demands of the United States Navy is striking the most welds.

Figure 1:
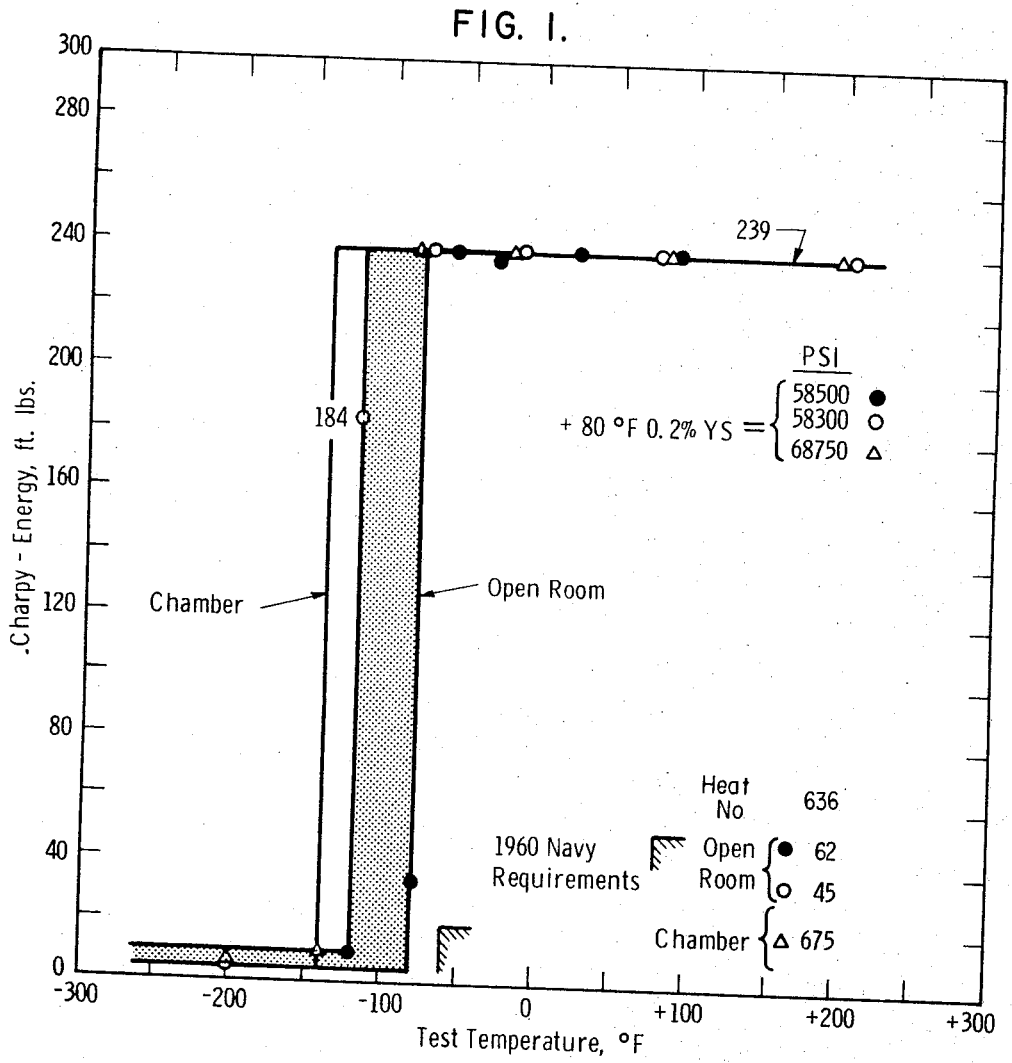
FIGS. 1 through 12 are graphs respectively showi the impact energies for the various welds including bo the in-chamber welds and the open room welds.
Figure 2:
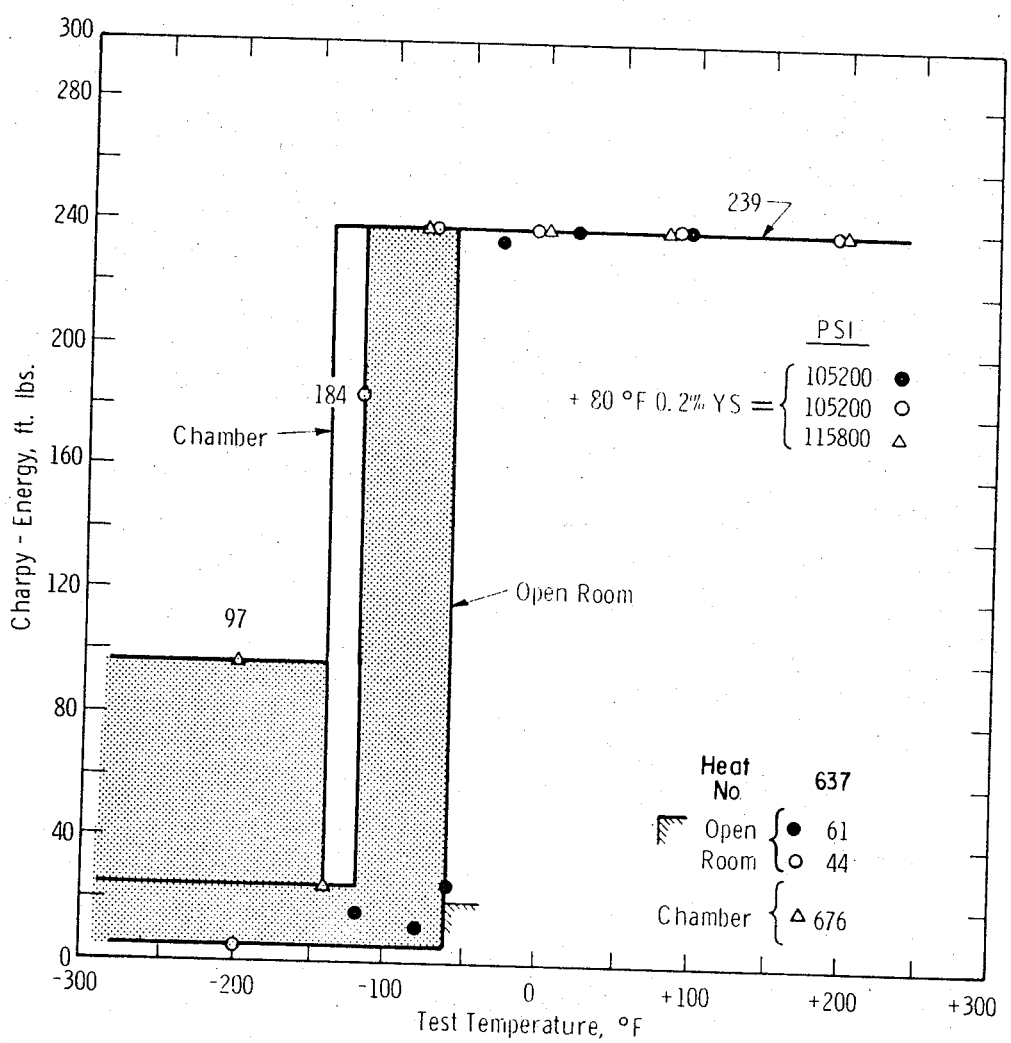
Figure 3:
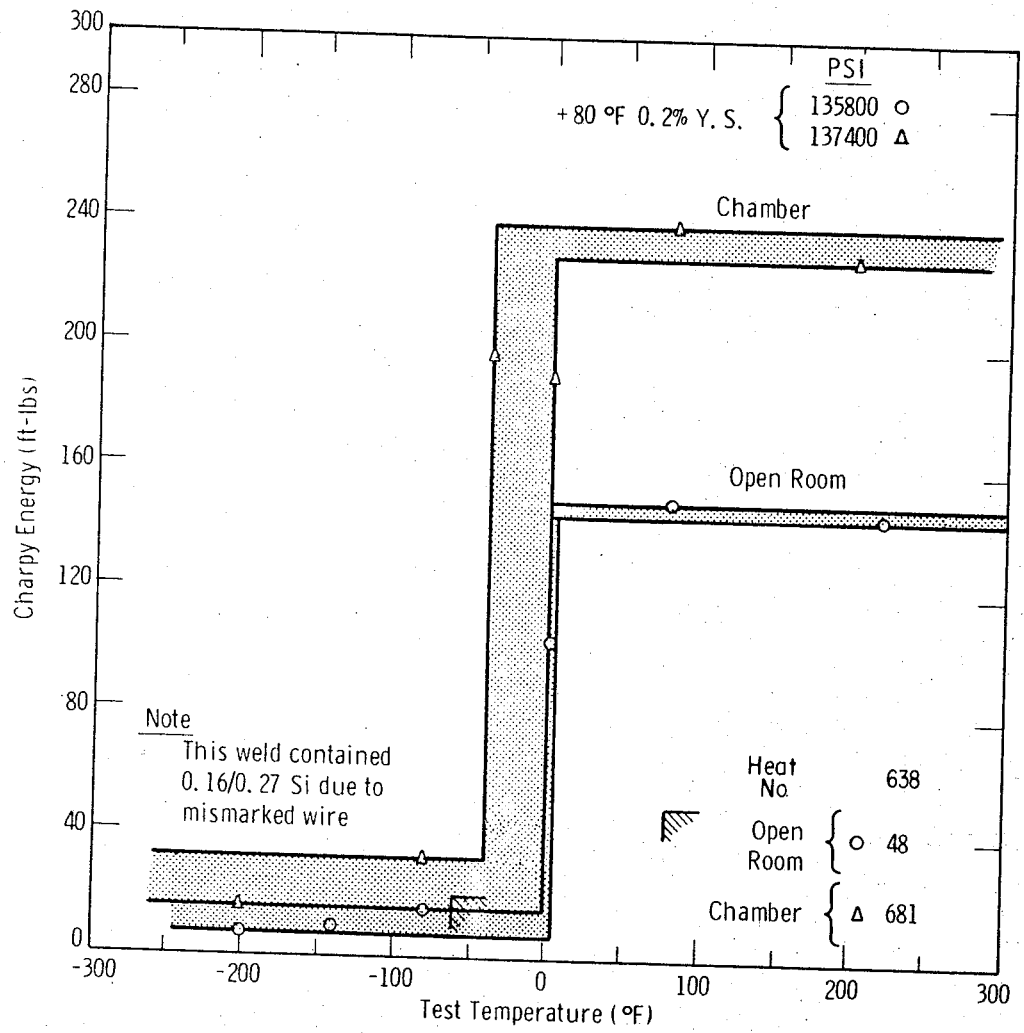
Figure 4:
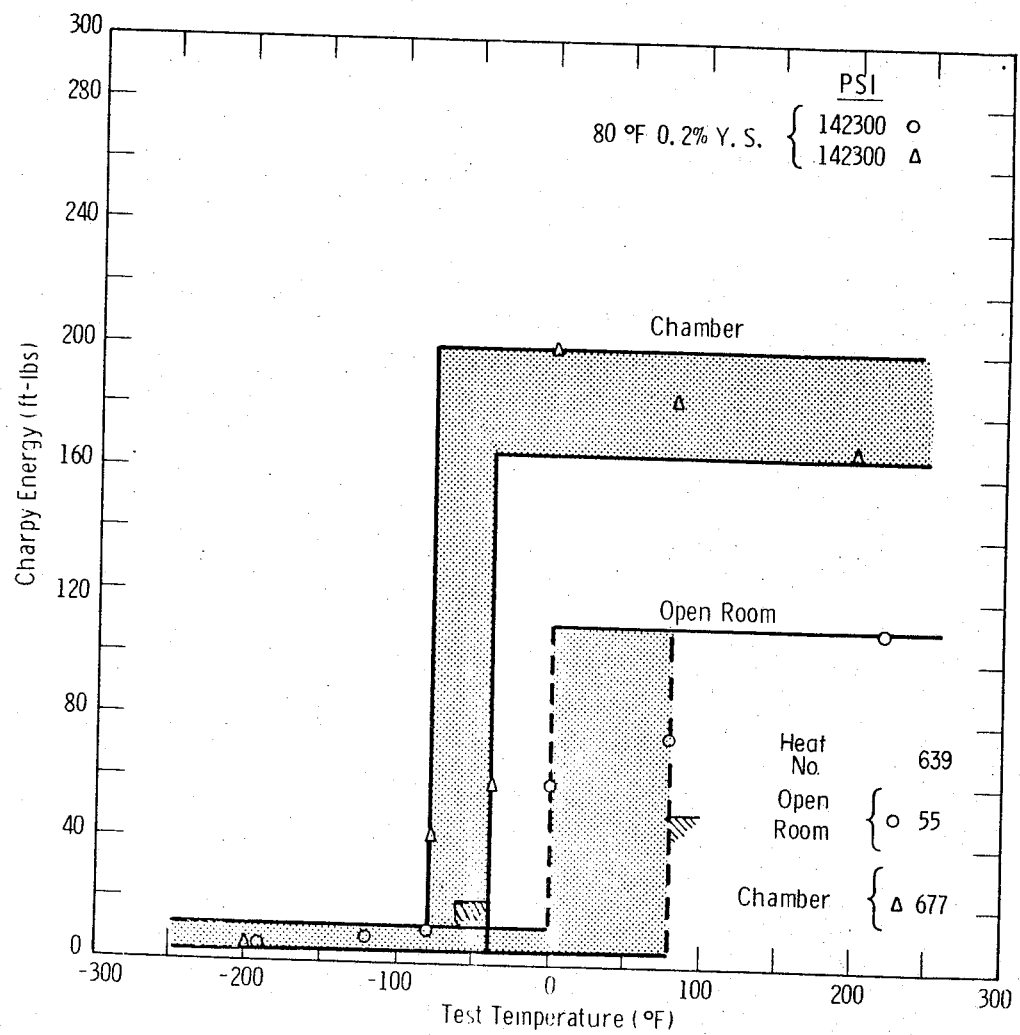
Figure 5:
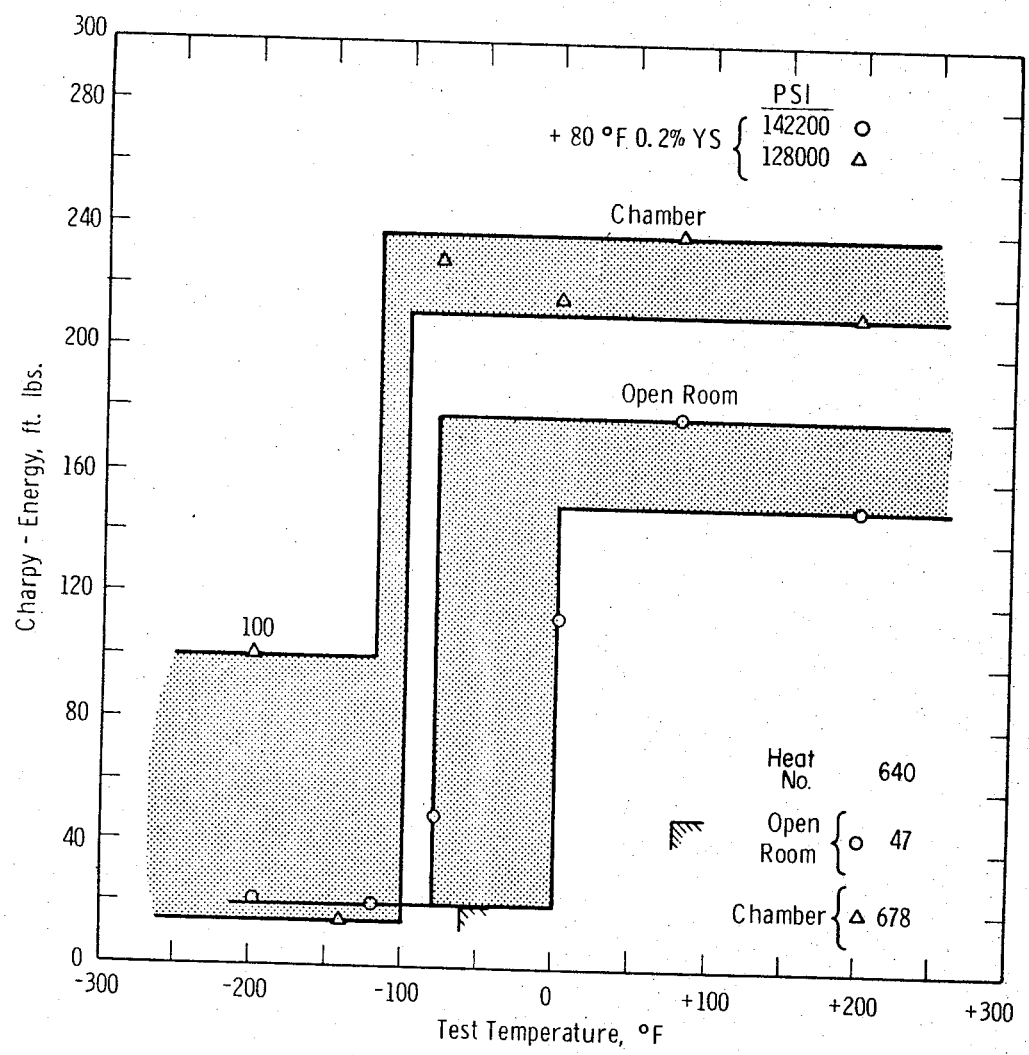
Figure 6:
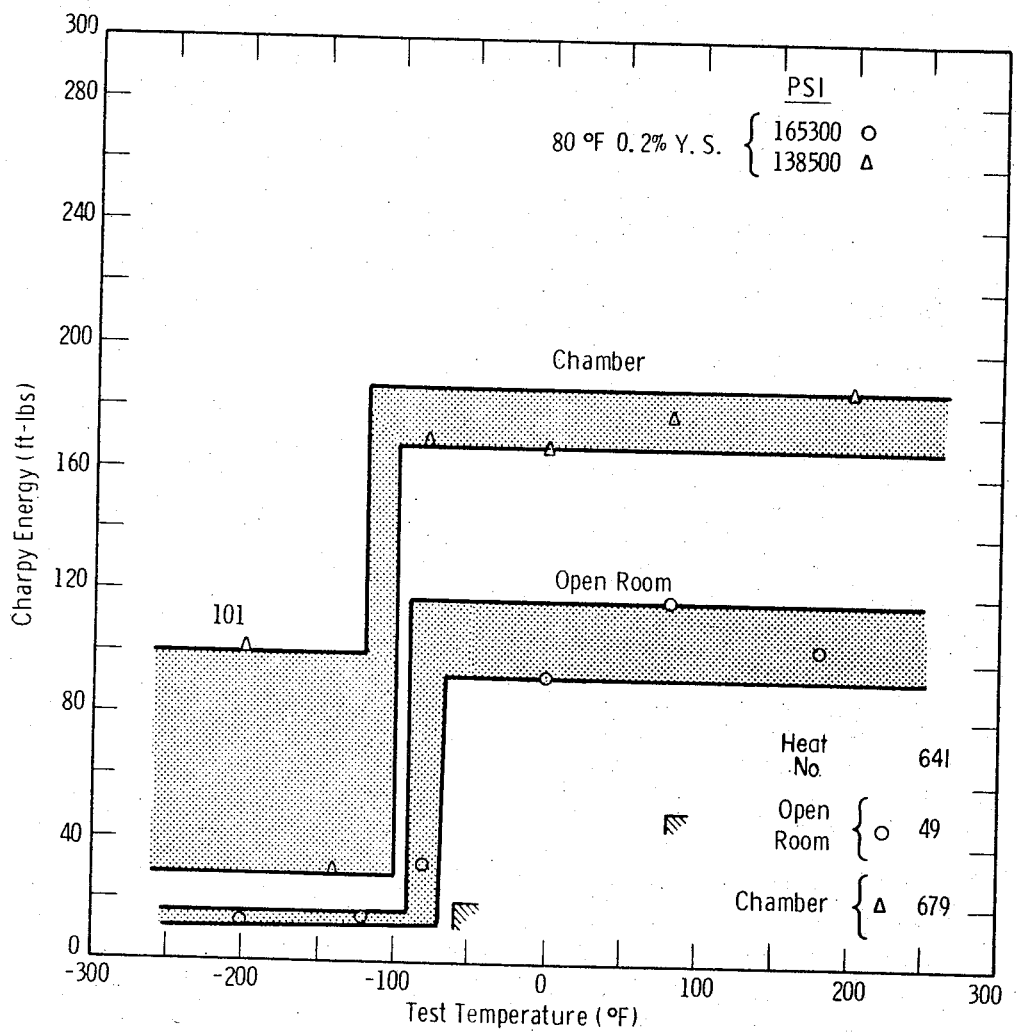
Figure 7:
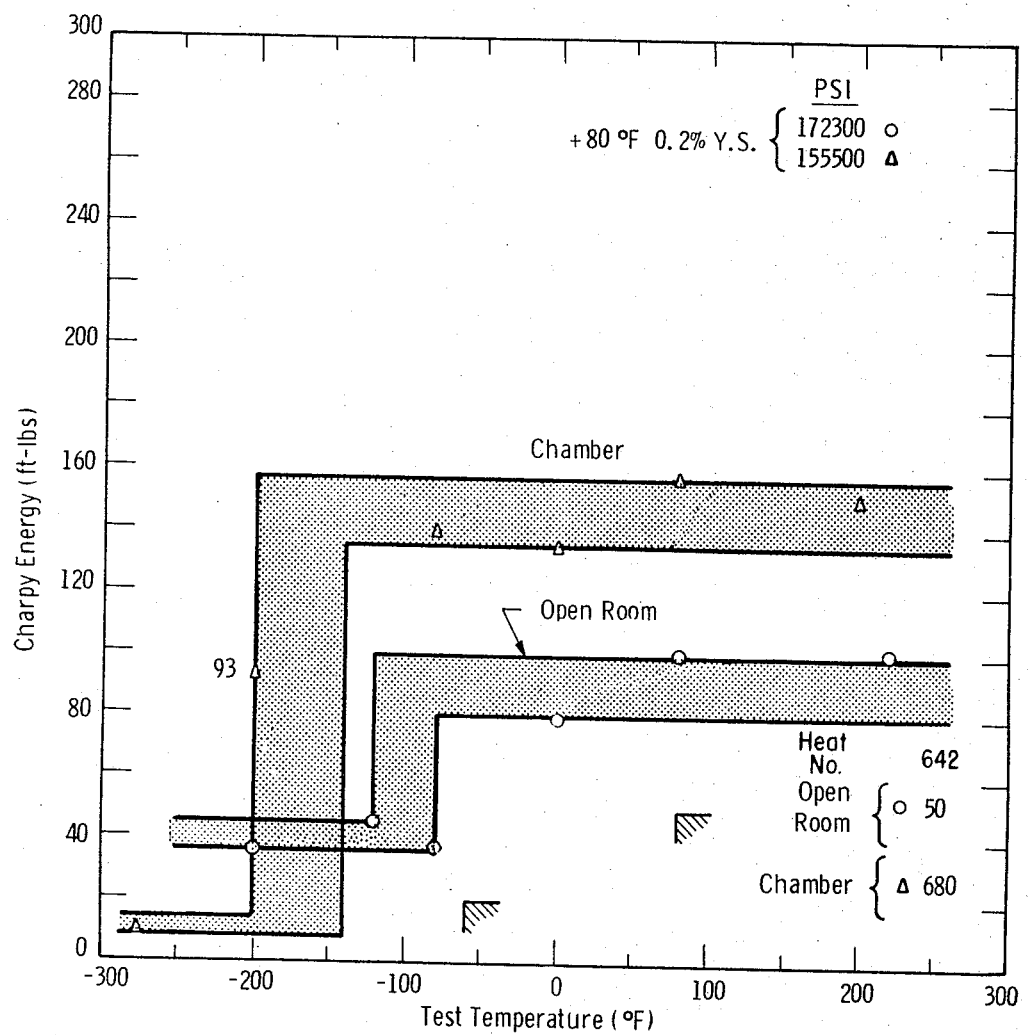
Figure 8:
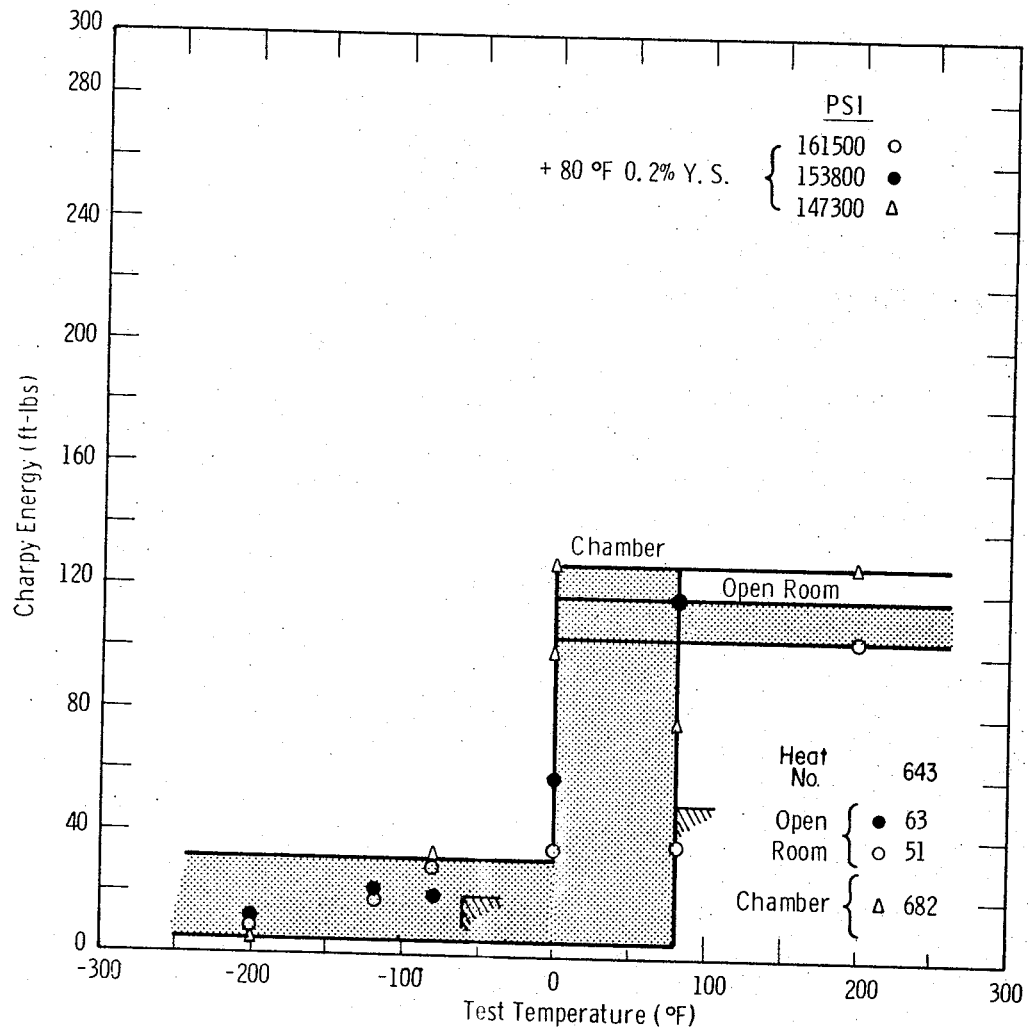
Figure 9:
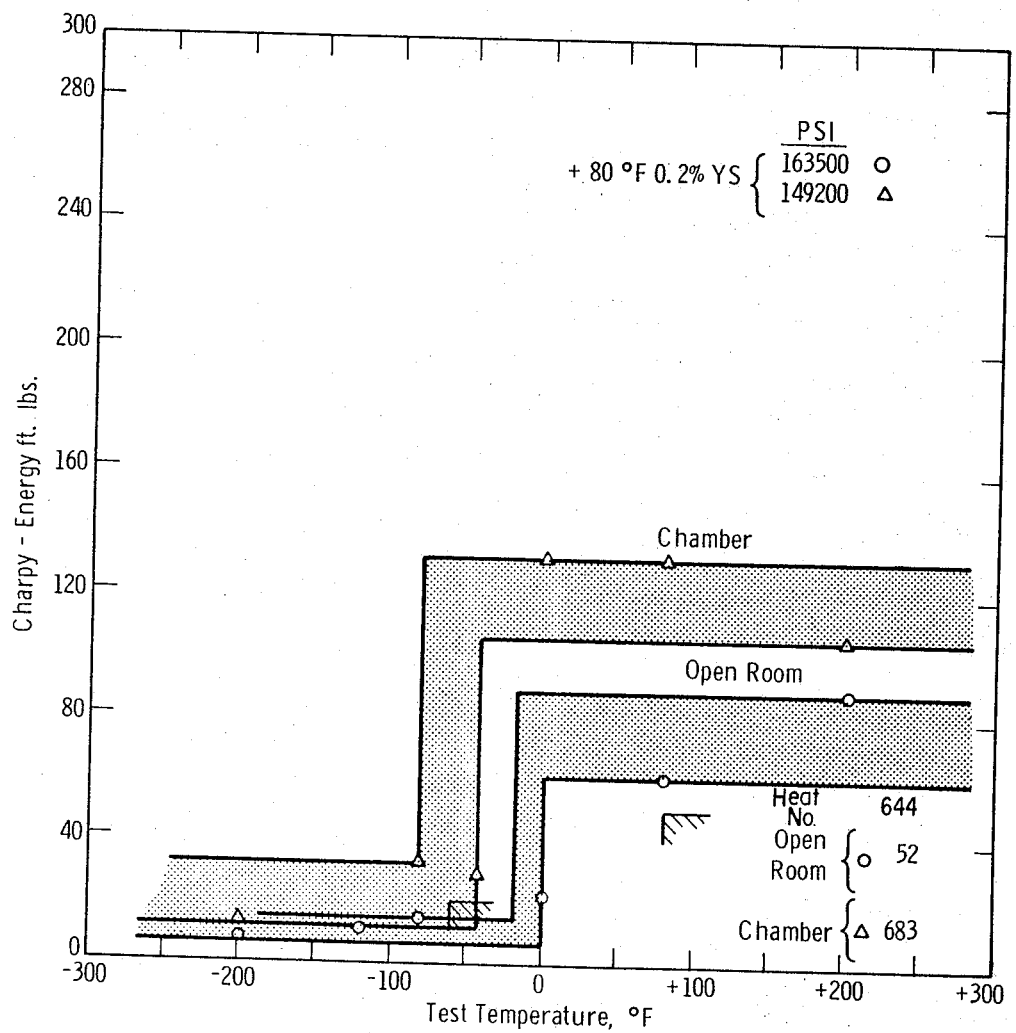
Figure 10:
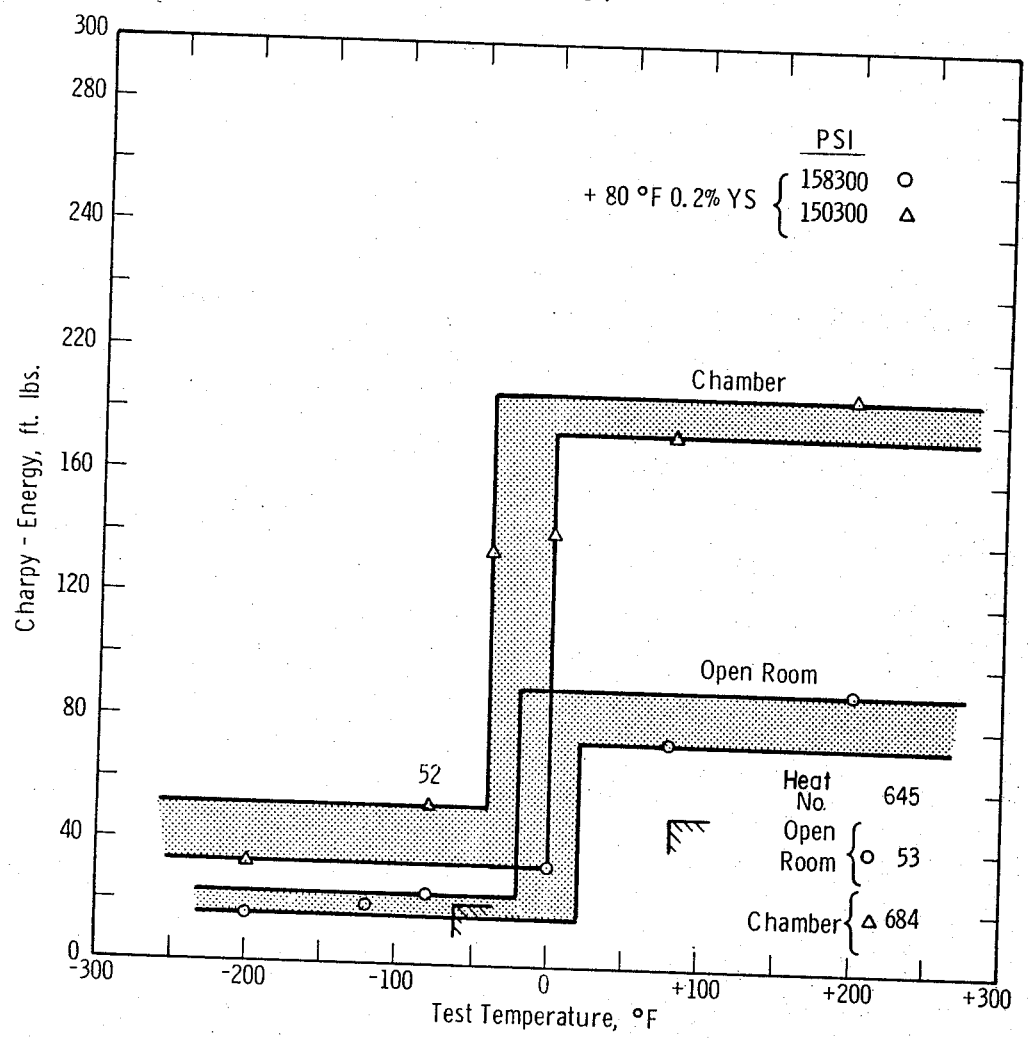
Figure 11:
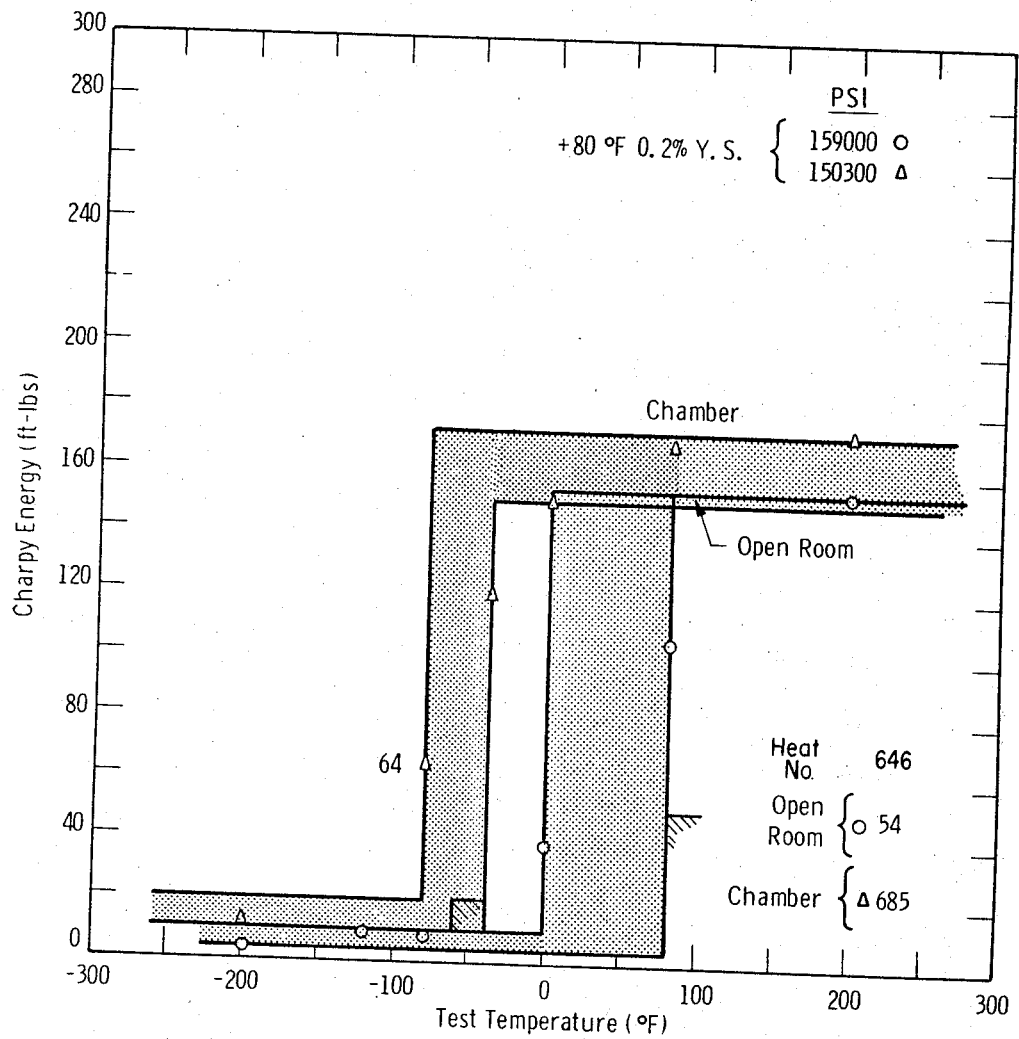
Figure 12:
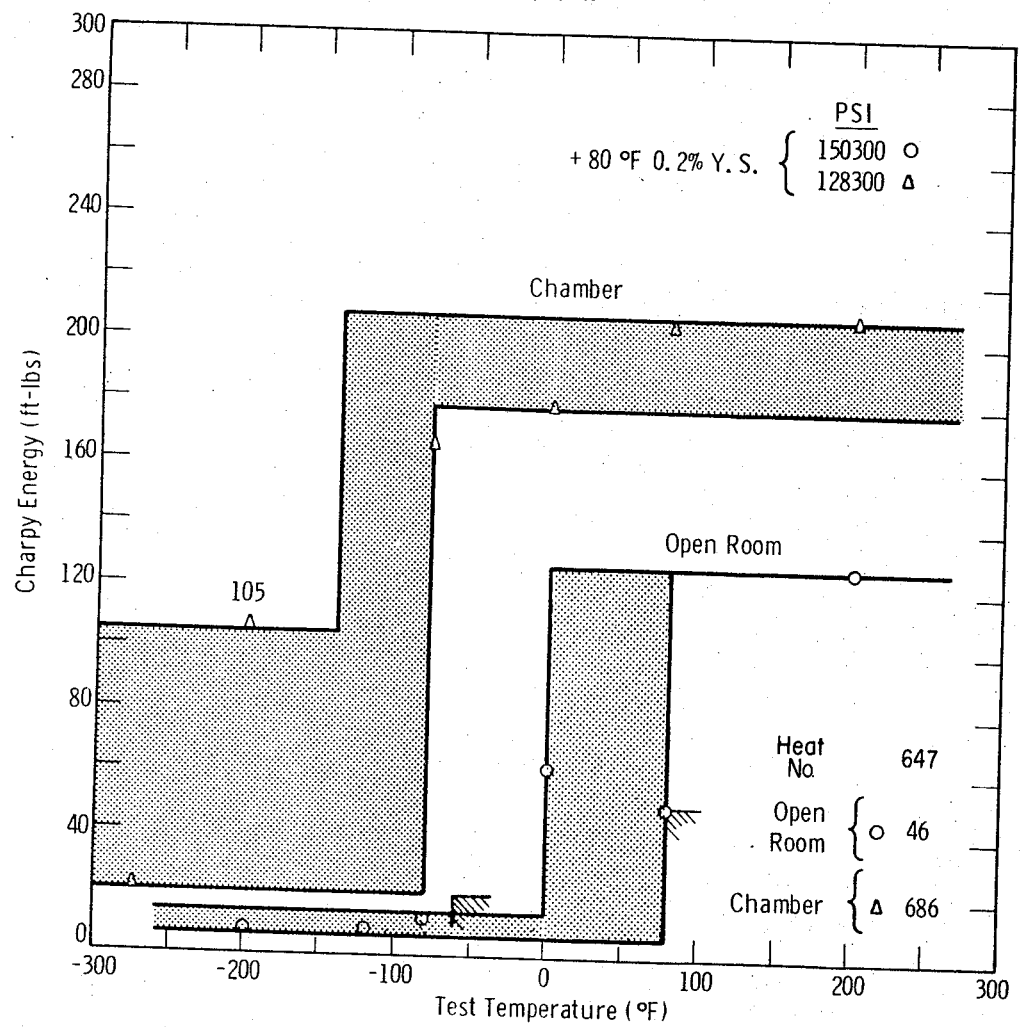
Figure 13:
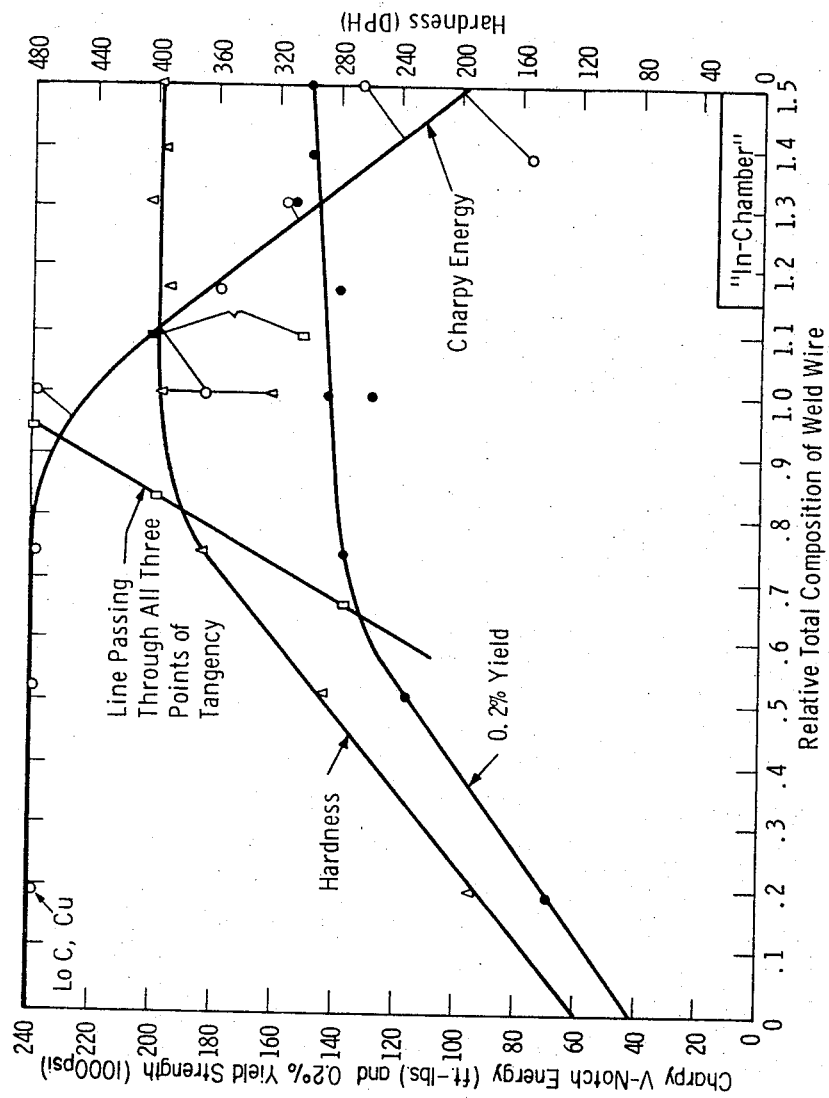
FIG. 13 is a graph showing the relationship betwe the impact data, hardness and strength as a function the alloying composition for the in-chamber welds ma in arriving at this invention.
Figure 14:
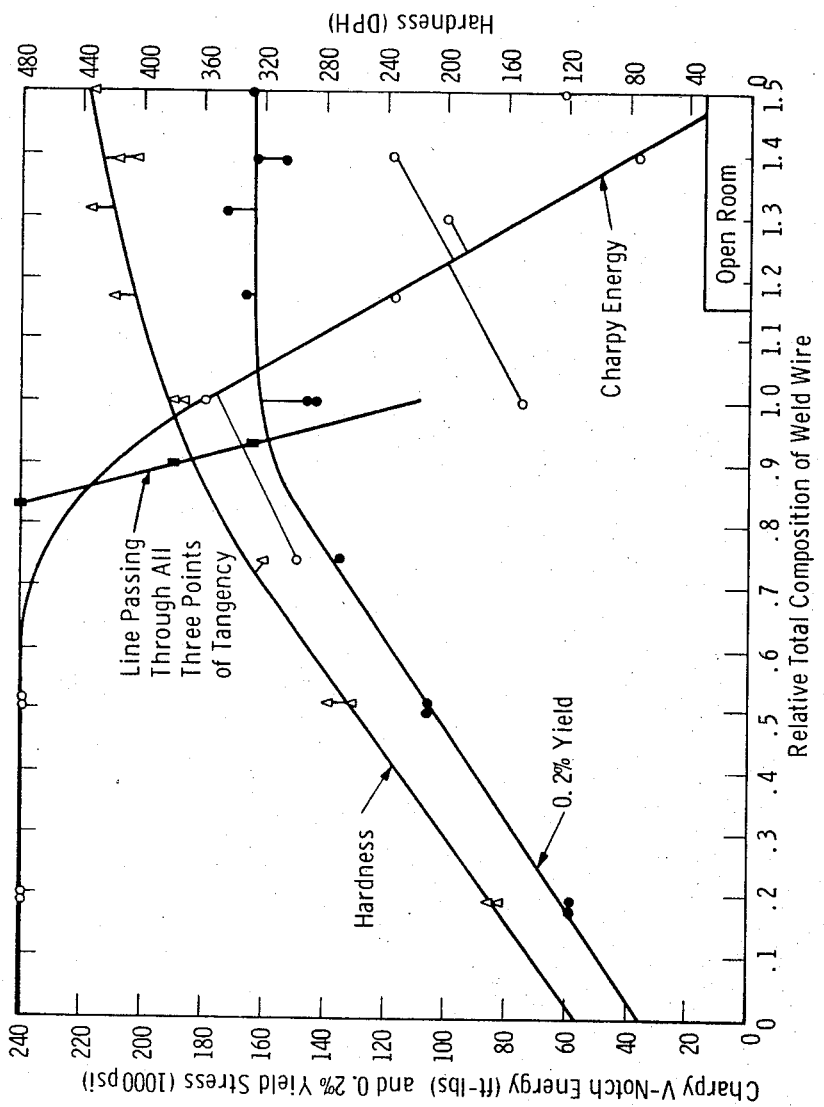
FIG. 14 is a like graph for the open room welds.

In FIGS. 13 and 14 the relative alloying composition of the wire is plotted horizontally and the Charpy Energy and the 2/10% YIELD STRENGTH and the hardness for the corresponding weld metal are plotted vertically. It appears that both the strength and the hardness start leveling off at an alloy content of about 8/10 and are substantially level at an alloy content of 1 to 1.1. The Charpy Energy drops off sharply substantially at the alloy content where the leveling off starts.

Figure 15A:
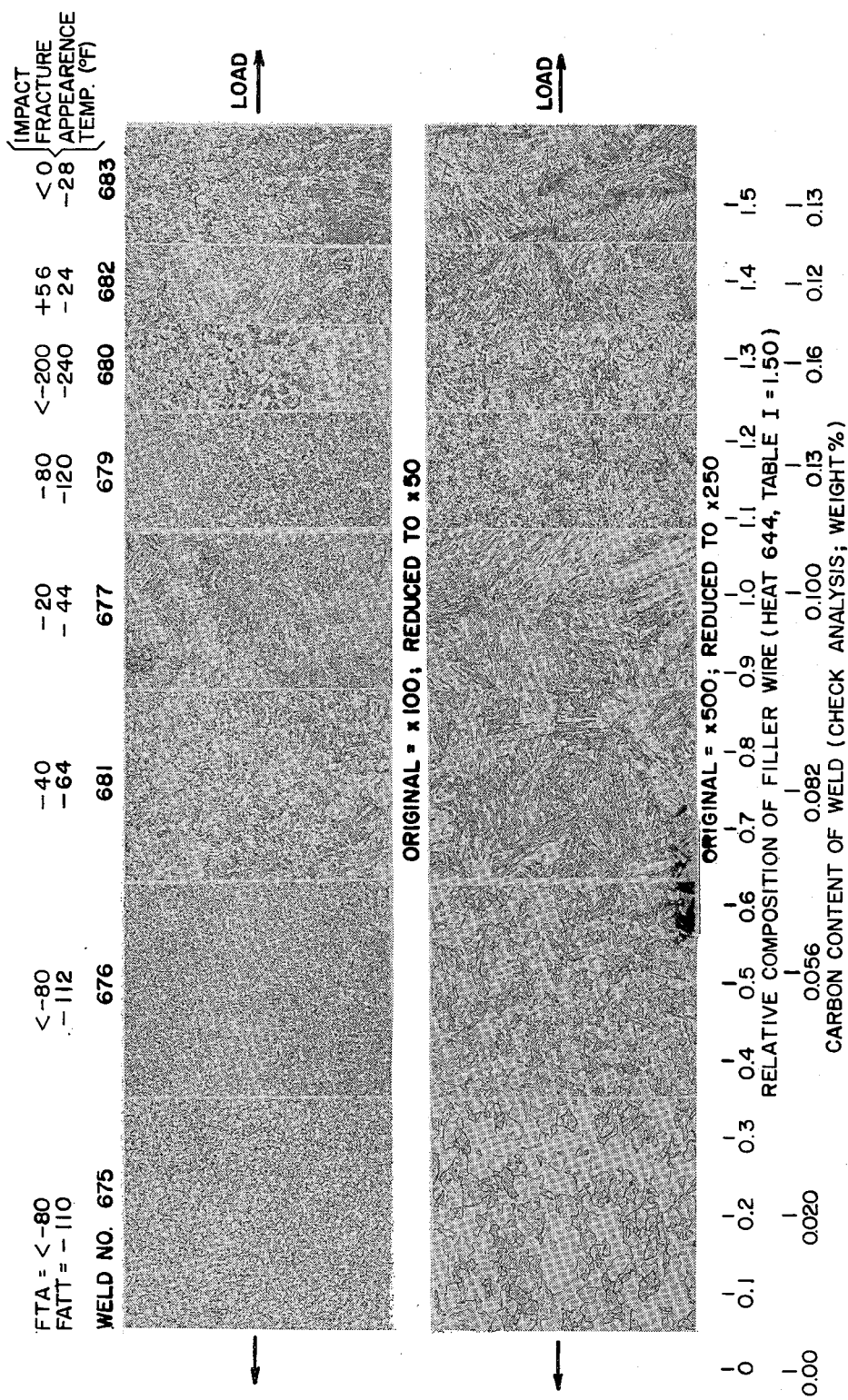
FIGS. 15A and 15B are copies of photomicrographs taken at 100 magnification and 500 magnification of the various welds made in arriving at this invention.
Figure 15B:
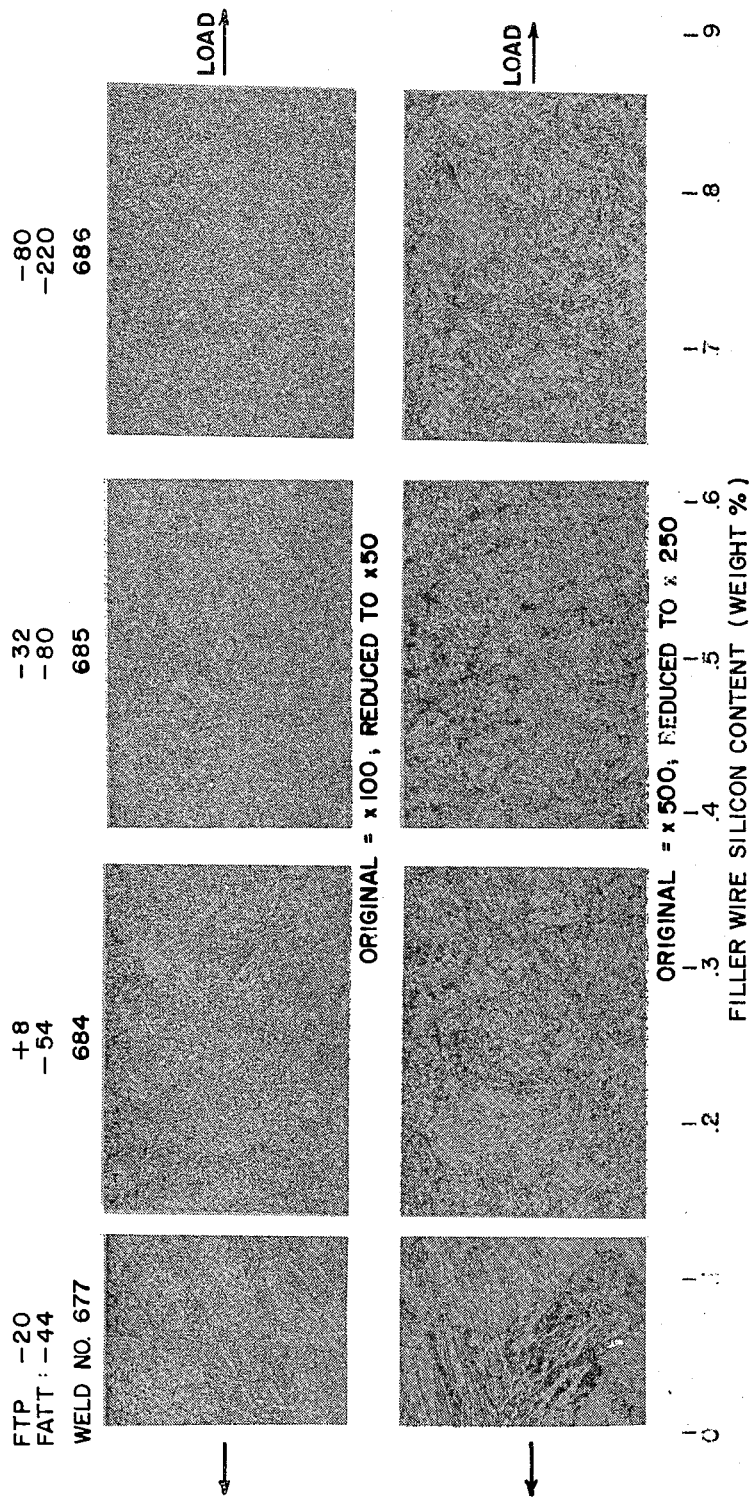

FIGS. 15A and 15B are photomicrographs of specimens of each of the welds 675, 676, 681, 677, 679, 680, 682, 683 and 677, 684, 685 and 686 respectively, each at 100 and 500 manifications. The cuts subjected to the photomicrographic process were cut from a specimen which had been ruptured by tension by a load applied in the direction of the arrows shown in FIGS. 15A and 15B respectively. The cuts were taken from a region of the specimen in which the elongation was proportional to the stress. For convenience the alloy content and the carbon content are indicated below the corresponding photomicrographs and the temperature at which the BRITTLE FRACTURE was zero (FTP) and 50% (FATT) is indicated above the corresponding photomicrographs. Photomicrographs 675, 676, 679, 682, 683, 684, 686 on the whole demonstrate fine structure of the welds produced. Photomicrographs 681 and 677 reveal that these specimens were coarse grained. This coarse grained structure was produced during the welding operation conceivably by maloperation of the welder himself and accounts for the low Charpy Energy values of 32 and 42 foot-pounds at −80° F. for welds 681 and 677. (See Table VII.) The irregular structure of the photomicrographs at 500 magnification of welds 675 and 676 are attributable to the ferrite content of these welds resulting from the low alloy content. The low alloy content leads to a highly ferritic structure.

Figure 16:
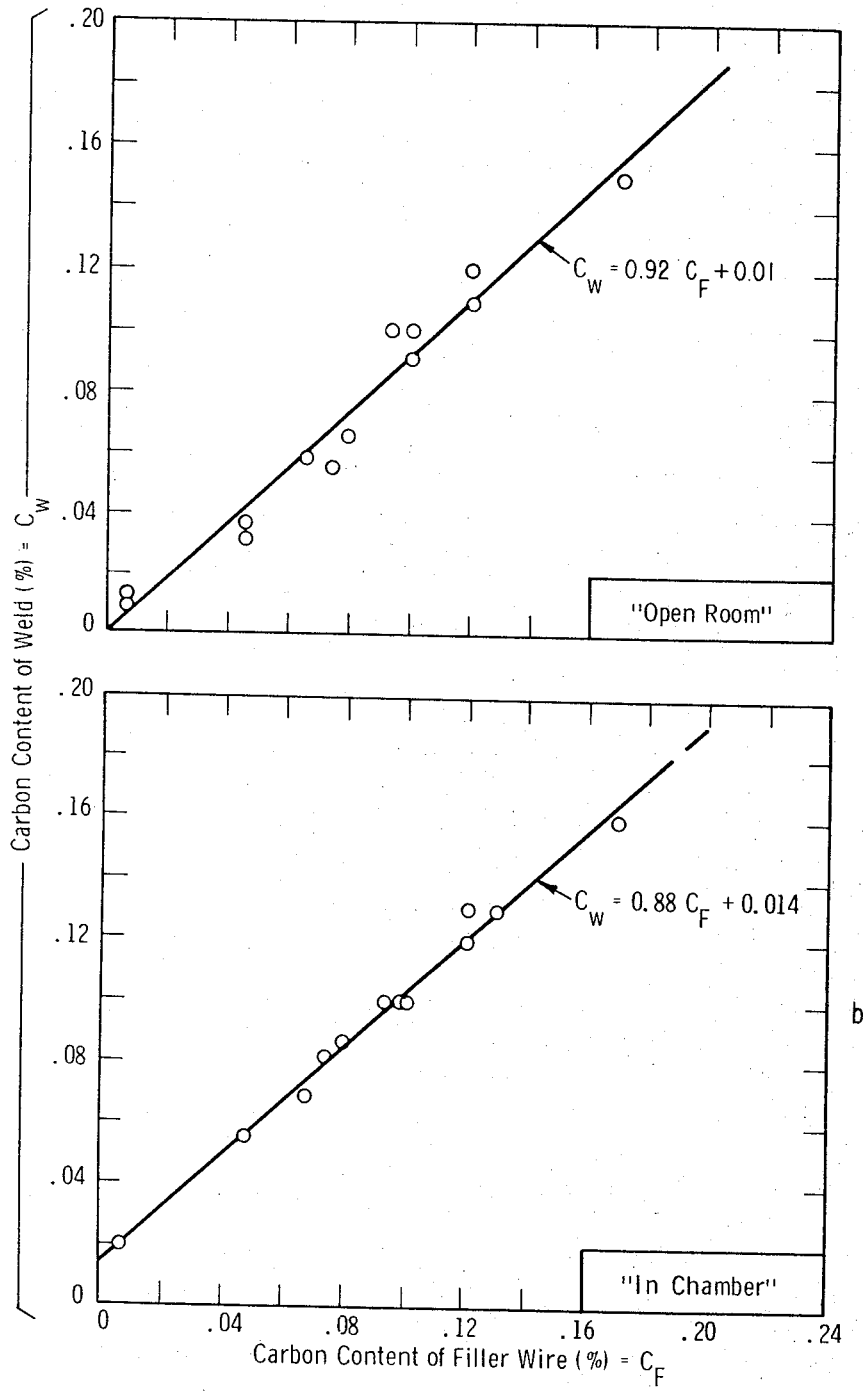
Figure 17:
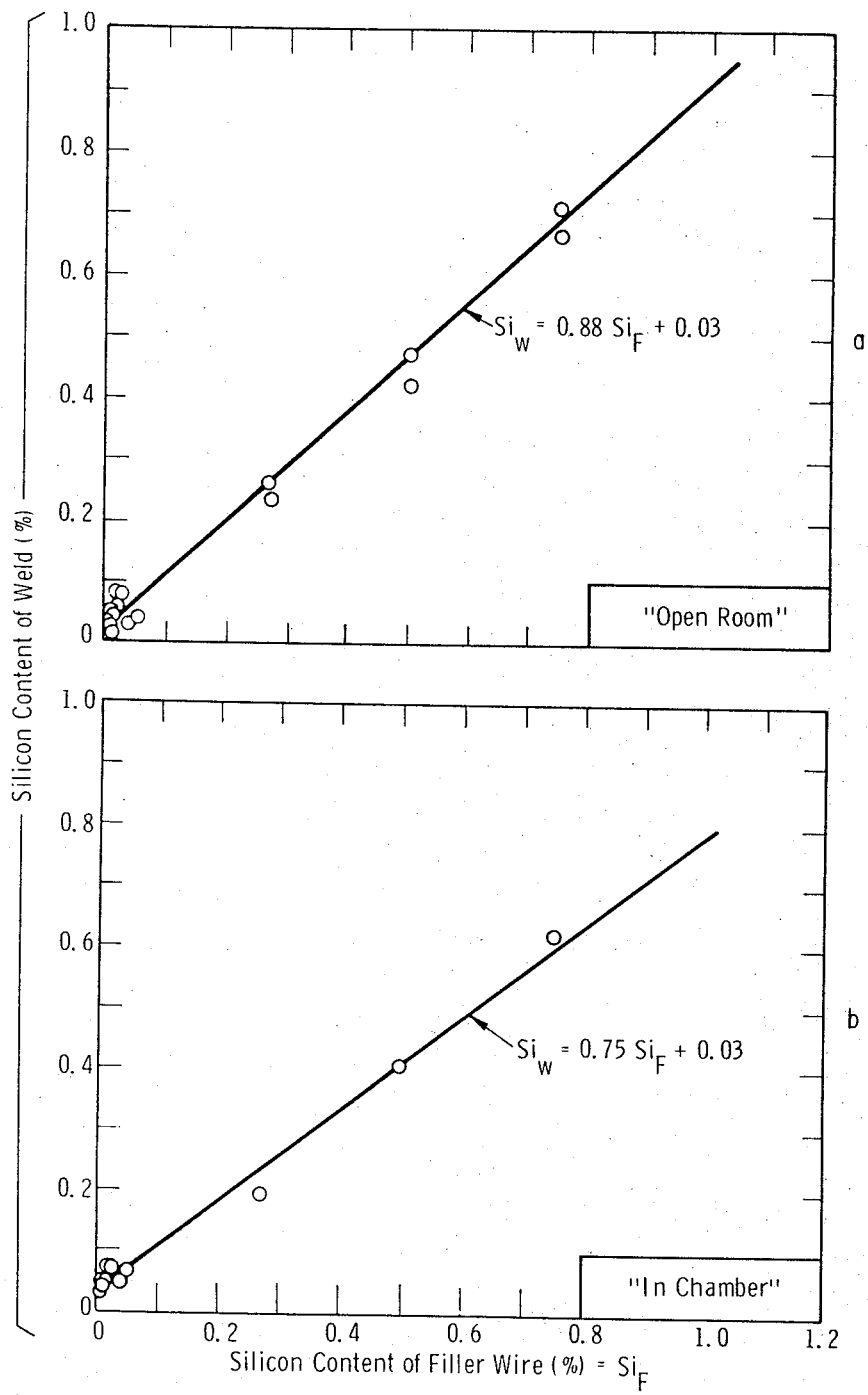
Figure 18:
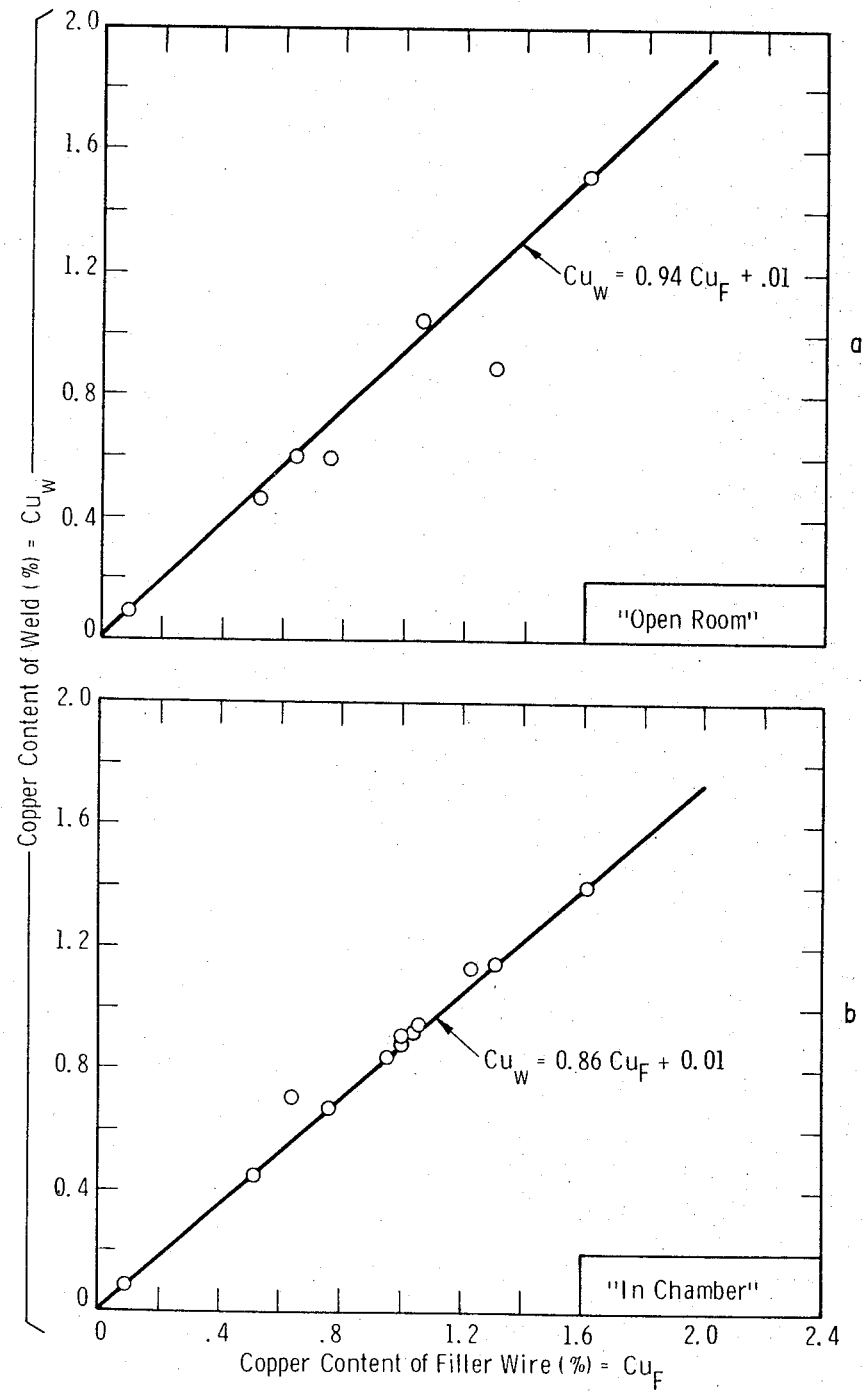
Figure 19:
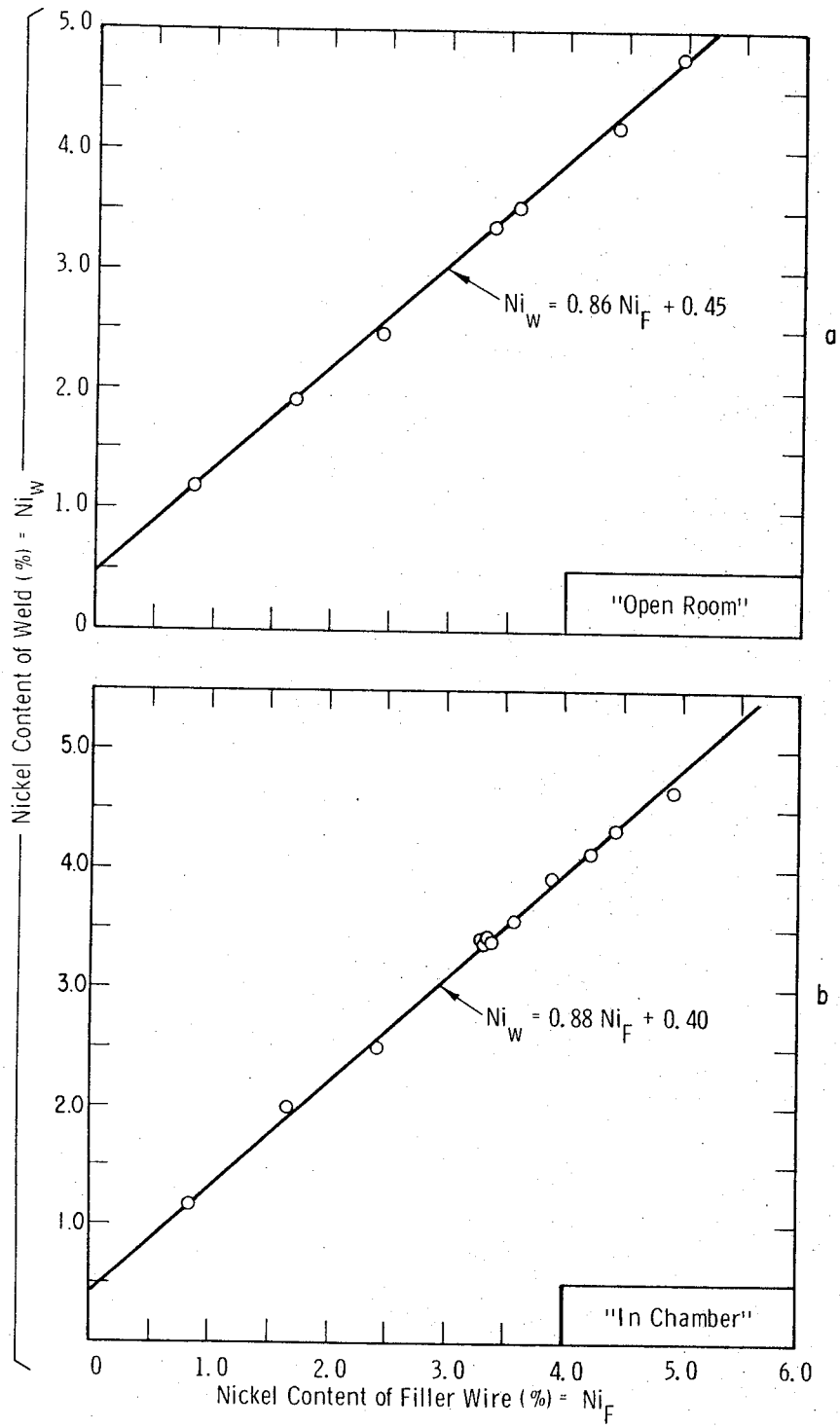
Figure 22:
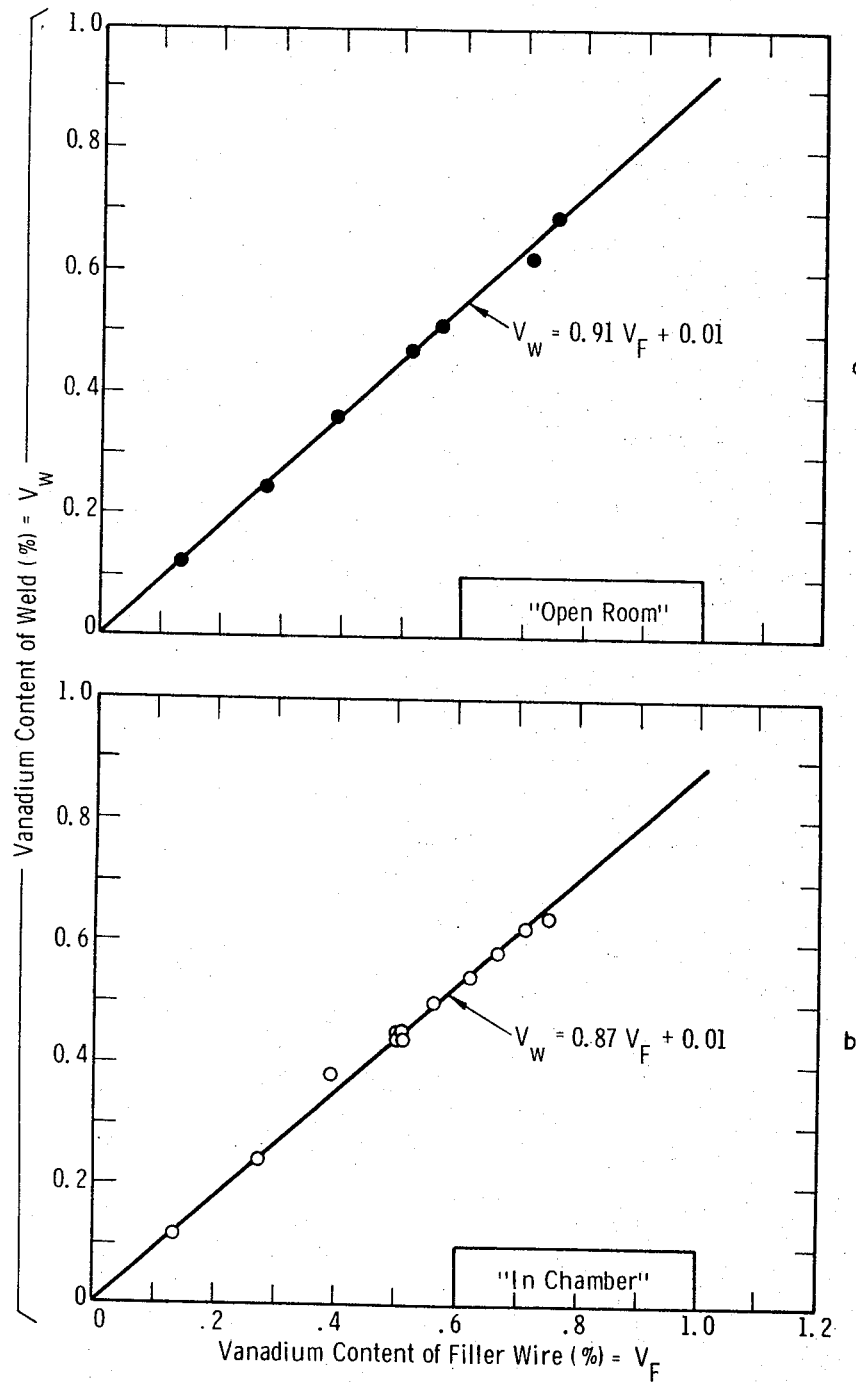
Figure 23:
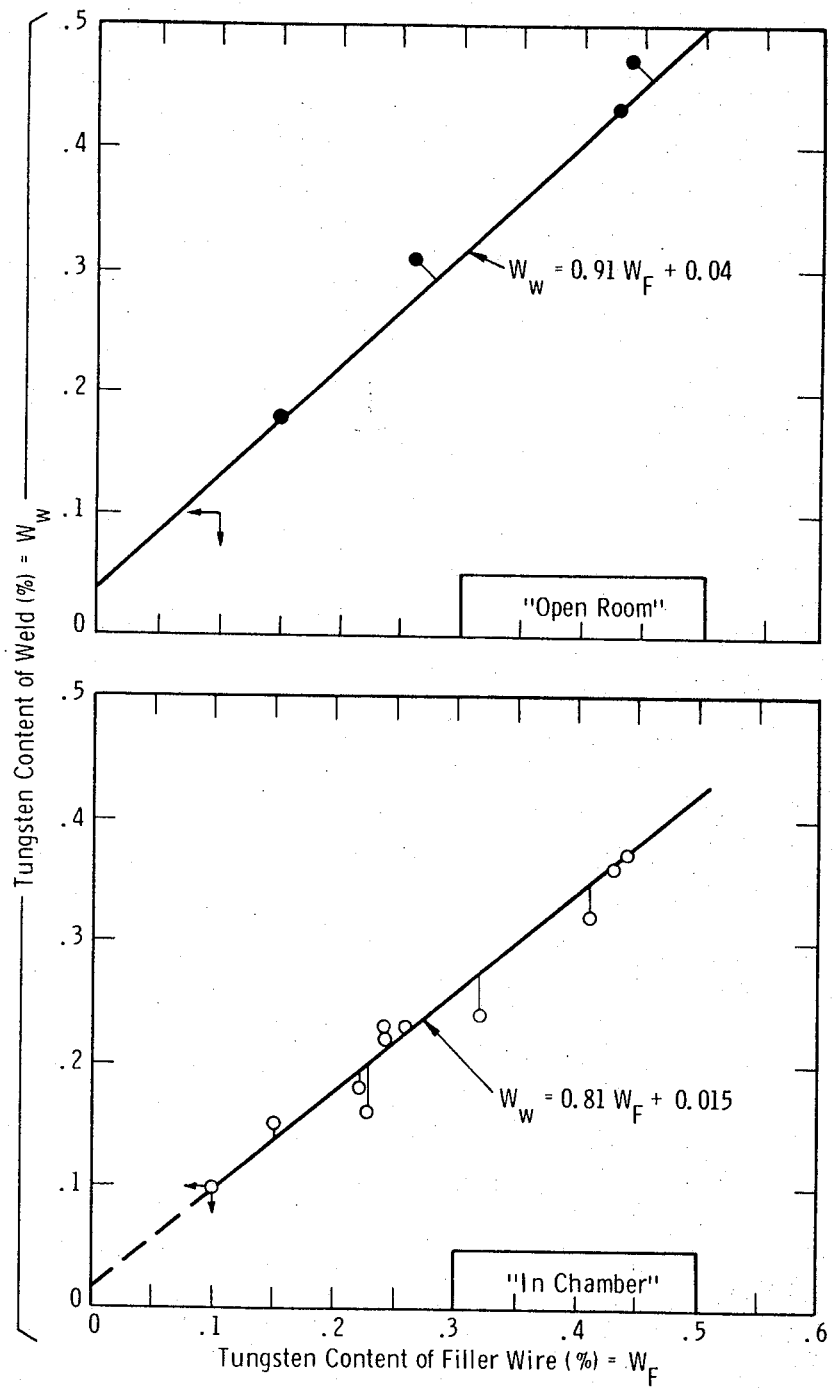
Figure 24:
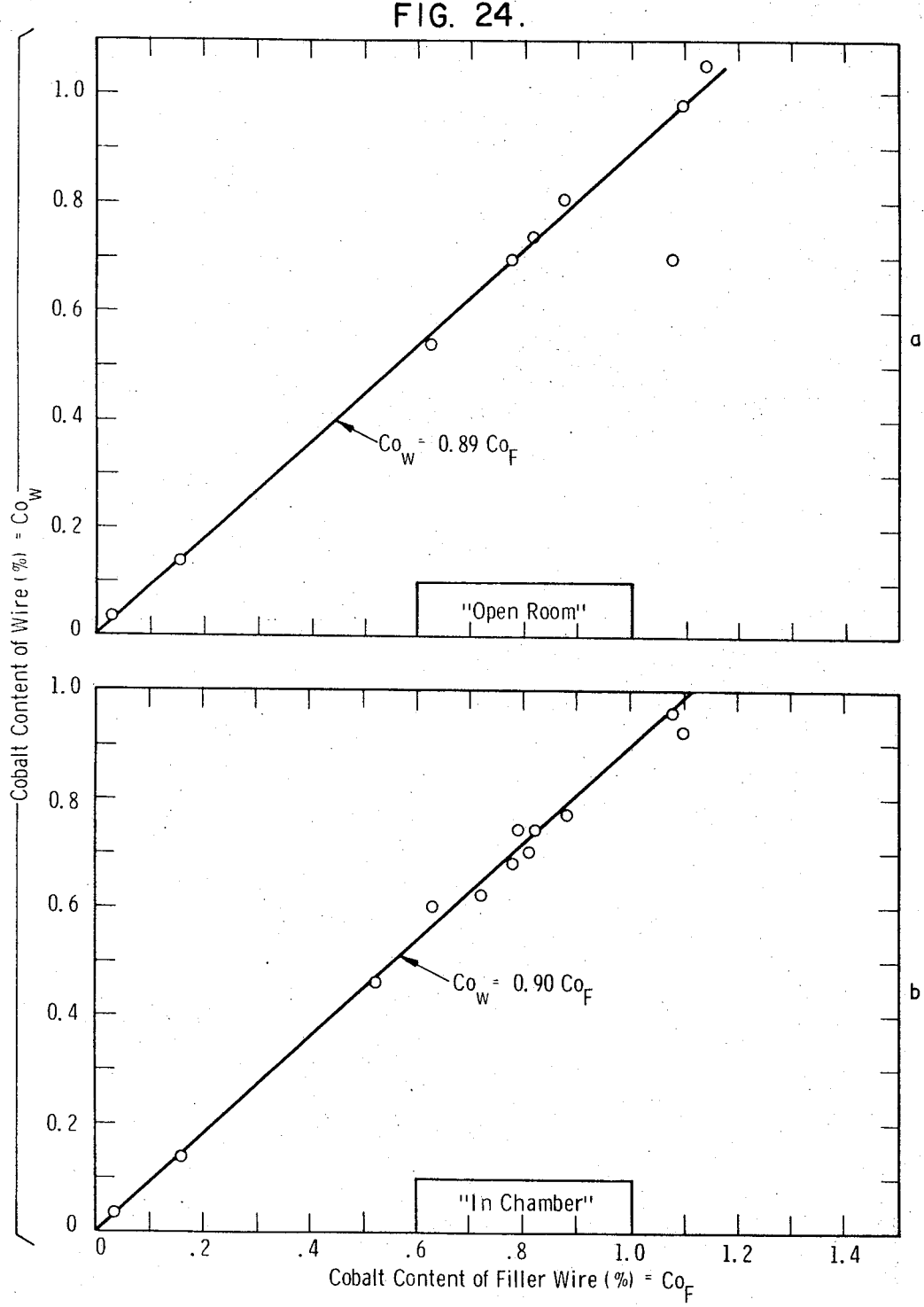

FIGS. 16 through 24 reveal an important ancillary feature of this invention. Each of these figures corresponds to an alloy component and includes two graphs. In graph (a) of each figure the content of the alloying component in the weld is plotted as a function of the content of this component in the filler wire for open-room welding. Graph (b) is a like plot for the in-chamber welding. In each case the content in the weld is plotted vertically and in the filler wire horizontally. FIG. 16 shows this graphically relationship for carbon, FIG. 17 for silicon, FIG. 18 for copper, FIG. 19 for nickel, FIG. 20 for chromium, FIG. 21 for molybdenum, FIG. 22 for vanadium, FIG. 23 for tungsten and FIG. 24 for cobalt. In each case, the functional relationship is seen to be linear with an intercept usually along the positive side of the ordinate. This intercept is equal to the quantity of the component which is derived from the work or plate welded.

FIGS. 16 to 24 afford a facility for determining from the composition of any work being welded the desired composition of the electrode. The graphs of FIGS. 16 to 24 are linear and may be defined by a linear equation in which the weld, or weld metal, content of a component is expressed as a function of the filler content of the same component. These equations are on the graphs. The filler content may be calculated from this equation for any weld metal content. In a typical situation consider the equation for the carbon for in-chamber welds. In this case the equation is $$C_W = 0.88 C_F + 0.014$$

In this equation 0.14 is the intercept and indicates that .014 percent carbon was derived from the plate or work. The carbon in the plate in the case for which FIG. 16 is plotted is .17 percent. (See page 7.) Roughly this indicates that about 10 percent of the plate or work carbon passed into the weld metal. Assume that another plate to be used has a carbon content of .34; in this case the intercept would be .028. The carbon content of the electrode to produce weld metal having the same carbon content as in the situation covered by FIG. 16 can be derived by solving the equation $C_W = .88 C_F + .028$ for $C_F$.

$$C_F = \frac{C_W - .028}{.88}$$

$C_W$ is the desired weld content of the component and is known. $C_F$ can then be computed. The same operations may be carried out by the other alloying components of the new plate.

While preferred practice of this invention has been disclosed herein many modifications are feasible. This invention then is not to be restricted except insofar as is necessitated by the spirit of the prior art.

I claim as my invention:

1. An arc-welding wire for producing high strength, high toughness, high ductility welds while arc welding in an atmosphere substantially free of oxygen and nitrogen; said material having at most a residual content of sulfur, phosphorous, nitrogen and oxygen, and consisting essentially of the following composition:

Mn—up to .013
C—between .046 and .17
Si—between .01 and .75
Cu—between .52 and 1.23
Ni—between 1.66 and 4.24
Cr—between .35 and .88
Mo—between .97 and 2.55
V—between .27 and .67
W—between .00 and .41
Co—between .030 and .88
Fe—Remainder.

2. The wire of claim 1 as a filler material for arc welding.

3. An arc-welding wire for producing high strength, high toughness, high ductility welds while arc welding in an atmosphere substantially free of oxygen and nitrogen; said material having at most a residual content of sulfur, phosphorous, nitrogen and oxygen, and consisting essentially of the following composition:

Mn—up to .013
C—between .046 and .17
Si—between .01 and .04
Cu—between .52 and 1.23
Ni—between 1.66 and 4.24
Cr—between .35 and .88
Mo—between .97 and 2.55
V—between .27 and .67
W—between .00 and .41
Co—between .030 and .88
Fe—Remainder.

4. The wire of claim 3 as a filler material for arc welding.

5. An arc-welding wire for producing high toughness, high ductility welds over the .2% YIELD STRENGTH range of about 68,750 to 155,500 pounds per square inch, while arc welding in an atmosphere substantially free of oxygen and nitrogen, said material having at most a residual content of sulfur, phosphorous, nitrogen and oxygen, and consisting essentially of the following composition:

Mn—up to .013
C—between .0064 to .17
Si—between 0 and .75
Cu—between .091 and 1.23
Ni—between .84 and 4.24
Cr—between .18 and .88
Mo—between .51 and 2.55
V—between .13 and .67
W—between 0 and .41
Co—between .03 and .88
Fe—Remainder.

6. A material for arc welding for producing by arc welding, in an atmosphere substantially free of nitrogen and oxygen, weld metal having a .2% YIELD STRENGTH exceeding 150,000 pounds per square inch, having Charpy Energy values exceeding 50 ft. pounds at −80° F., and a TOTAL ELONGATION exceeding 20% and AREA REDUCTION exceeding 75%, the said material having at most residual contents of sulfur, phosphorous, nitrogen and oxygen, and consisting essentially of the following composition in percent:

Mn—up to .013
C—.099–.17
Si—less than .27
Cu—.95–1.04
Ni—3.22–4.24
Cr—.69–.88
Mo—2.01–2.55
V—.49–.67
W—.22–.41
Co—.77–.79
Fe—Remainder.

7. A material for arc welding for producing by arc welding, in an atmosphere substantially free of nitrogen and oxygen, weld metal having a .2% YIELD STRENGTH exceeding 150,000 pounds per square inch, having Charpy Energy values exceeding 139 ft. pounds at −80° F., and a TOTAL ELONGATION exceeding 20% and AREA REDUCTION exceeding 75%, the said material having at most residual contents of sulfur, phosphorous, nitrogen and oxygen, and consisting essentially of the following composition in percent:

Mn—up to .013
C—.099–.17
Si—.01–.03
Cu—.95–.96
Ni—3.22–4.24
Cr—.69–.88
Mo—2.01–2.55
V—.49–.67
W—.36–.41
Co—.77–.78
Fe—Remainder.

8. A material for arc welding for producing by arc welding, in an atmosphere substantially free of nitrogen and oxygen, weld metal having a .2% YIELD STRENGTH exceeding 100,000 pounds per square inch, having Charpy Energy values exceeding 50 ft. pounds at −80° F., and a TOTAL ELONGATION exceeding 20% and AREA REDUCTION exceeding 75%, the said material having at most residual contents of sulfur, phosphorous, nitrogen and oxygen, and consisting essentially of the following composition in percent:

Mn—up to .013
C—.046 to .17
Si—not more than .27
Cu—.52 to 1.23
Ni—1.66 to 4.24
Cr—.35 to .88
Mo—.97 to 2.55
V—.27 to .67
W—not more than .41
Co—.030 to .88
Fe—Remainder.

References Cited
UNITED STATES PATENTS

| | | | |
|---|---|---|---|
| 2,140,237 | 12/1938 | Leitner | 219—145 X |
| 2,810,818 | 10/1957 | Rothschild | 219—137 |
| 2,913,814 | 11/1959 | Muller | 75—128 X |
| 2,913,815 | 11/1959 | Muller | 75—128 X |
| 3,088,196 | 5/1963 | Tour | 75—128 X |
| 3,097,294 | 7/1963 | Kubli | 75—124 X |
| 3,115,406 | 12/1963 | Ballass | 75—124 |
| 3,139,508 | 6/1964 | Freeman | 219—137 X |

DAVID L. RECK, *Primary Examiner.*

P. WEINSTEIN, *Assistant Examiner.*